US012410057B2

(12) United States Patent
Peddini et al.

(10) Patent No.: US 12,410,057 B2
(45) Date of Patent: Sep. 9, 2025

(54) MIXTURES OF DISCRETE CARBON NANOTUBES

(71) Applicant: MOLECULAR REBAR DESIGN, LLC, Austin, TX (US)

(72) Inventors: Sateesh Kumar Peddini, Austin, TX (US); August Charles Krupp, Austin, TX (US); Nancy Henderson, Austin, TX (US); Kurt W. Swogger, Austin, TX (US); Clive P. Bosnyak, Dripping Springs, TX (US)

(73) Assignee: MOLECULAR REBAR DESIGN, LLC, Austin, TX (US)

( * ) Notice: Subject to any disclaimer, the term of this patent is extended or adjusted under 35 U.S.C. 154(b) by 1000 days.

(21) Appl. No.: 17/335,998

(22) Filed: Jun. 1, 2021

(65) Prior Publication Data

US 2021/0284538 A1    Sep. 16, 2021

Related U.S. Application Data

(63) Continuation-in-part of application No. 16/208,194, filed on Dec. 3, 2018, now Pat. No. 11,053,362, which is a continuation-in-part of application No. 16/157,499, filed on Oct. 11, 2018, now Pat. No. 11,014,815.

(60) Provisional application No. 62/571,026, filed on Oct. 11, 2017.

(51) Int. Cl.
| | |
|---|---|
| *C01B 32/158* | (2017.01) |
| *C01B 25/45* | (2006.01) |
| *C01G 53/44* | (2025.01) |

(52) U.S. Cl.
CPC .......... *C01B 32/158* (2017.08); *C01B 25/45* (2013.01); *C01G 53/44* (2013.01); *C01P 2004/61* (2013.01)

(58) Field of Classification Search
CPC ... C01B 32/158; C01G 53/44; C01P 2004/61; C08K 3/041
See application file for complete search history.

(56) References Cited

U.S. PATENT DOCUMENTS

| | | | |
|---|---|---|---|
| 4,984,376 A * | 1/1991 | Walter | A43B 13/38 36/114 |
| 5,274,037 A | 12/1993 | Miller | |
| 5,972,082 A | 10/1999 | Koyano et al. | |
| 6,632,974 B1 | 10/2003 | Suzuki et al. | |
| 6,783,746 B1 | 8/2004 | Zhang et al. | |
| 7,601,421 B2 | 10/2009 | Khabashesku et al. | |
| 7,763,229 B2 | 7/2010 | Nikolaev et al. | |
| 2001/0007002 A1 | 7/2001 | Hiiro et al. | |
| 2002/0055547 A1 | 5/2002 | Sassa | |
| 2003/0049443 A1 | 3/2003 | Nishimura et al. | |
| 2003/0144375 A1 | 7/2003 | Wu et al. | |
| 2005/0002850 A1 | 1/2005 | Niu et al. | |
| 2006/0211327 A1 | 9/2006 | Lee et al. | |
| 2007/0228601 A1 | 10/2007 | Chen | |
| 2010/0004468 A1 | 1/2010 | Wong et al. | |
| 2011/0200927 A1 | 8/2011 | Jung et al. | |
| 2013/0140498 A1 | 6/2013 | Murphy et al. | |
| 2014/0235758 A1 | 8/2014 | Cheng et al. | |
| 2016/0020466 A1 | 1/2016 | Ulbrich et al. | |

FOREIGN PATENT DOCUMENTS

| | | |
|---|---|---|
| CN | 1402888 A | 3/2003 |
| JP | 2009197197 A | 9/2009 |
| KR | 10-2008-0111488 | 12/2008 |
| WO | 200135473 A1 | 5/2001 |
| WO | 2008054845 A2 | 5/2008 |
| WO | 2008067137 A2 | 6/2008 |
| WO | 2011163129 A2 | 12/2011 |
| WO | 2014143140 A1 | 9/2014 |
| WO | 2016029798 A1 | 3/2016 |
| WO | 2017177166 A1 | 10/2017 |

OTHER PUBLICATIONS

Notice of Reasons for Rejection dated Jul. 14, 2022 for Japanese Application No. 2020-520145.
Chaturvedi, Poornendu et al., "Carbon Nanotube-Purification and Sorting Protocols" Defence Science Journal, vol. 58, No. 5, Sep. 2008, pp. 591-599.
Kim, Dong Sik et al., Individualization of Single-walled Carbon Nanotubes: Is the Solvent Important? Small, 2005, 1, No. 11, pp. 1117-1124.
International Search Report and Written Opinion dated Feb. 4, 2019 for PCT/US2018/055413 [From parent].
Peddini S.K et al., Nanocomposites from styrene-butadiene rubber (SBR) and multiwall carbon nanotubes (MWCNT) part 1: Morphology and rheology, Polymer 55 (2014) pp. 258-270.
Datsyuk V. et al., Chemical oxidation of multiwalled carbon nanotubes, Carbon 46 (2008) pp. 833-840.

* cited by examiner

*Primary Examiner* — Alexander C Kollias
(74) *Attorney, Agent, or Firm* — HUNTON ANDREWS KURTH LLP

(57) ABSTRACT

Dry liquid concentrates allow carbon nanotubes to be dispersed in various mediums under standard composite processing conditions. The incorporation of carbon nanotubes can enhance the physical properties of the resulting material, such as, for example, improving the anti-corrosive properties of thermosets if present, and/or improving electrical properties of transitional metal oxide composites.

19 Claims, 17 Drawing Sheets

MIXTURES OF DISCRETE CARBON NANOTUBES

CROSS REFERENCE TO RELATED APPLICATIONS

This application is a continuation-in-part of U.S. application Ser. No. 16/208,194 filed on Dec. 3, 2018 which is a continuation-in-part of U.S. application Ser. No. 16/157,499 filed on Oct. 11, 2018 which claims the benefit of U.S. Provisional Application Ser. No. 62/571,026 filed Oct. 11, 2017, the disclosures of each of which is incorporated herein by reference.

FIELD OF INVENTION

The present invention is directed to novel carbon nanotube compositions and formulations thereof, such as with oils and/or at least one solvent and rubbers.

BACKGROUND AND SUMMARY

Carbon nanotubes can be classified by the number of walls in the tube, single-wall, double wall, and multiwall. Carbon nanotubes are currently manufactured as agglomerated nanotube balls, bundles, or forests attached to substrates. Use of carbon nanotubes as a reinforcing agent in elastomeric compositions, polymer composites, and rubber composites is an area in which carbon nanotubes have been shown to have significant utility. The utilization of carbon nanotubes in these applications was previously hampered due to the general inability to reliably produce individualized carbon nanotubes and the ability to disperse the individualized carbon nanotubes in a matrix. Previous research by Bosnyak et al., disclosed in various patent applications (e.g., US 2012-0183770 A1 and US 2011-0294013 A1), have made discrete carbon nanotubes through judicious and substantially simultaneous use of oxidation and shear forces, thereby oxidizing both the inner and outer surface of the nanotubes, typically to about the same oxidation level on the inner and outer surfaces, resulting in individual or discrete tubes.

The present invention differs from those earlier Bosnyak et al. applications and disclosures. The present invention describes a composition of carbon nanotubes and manufacturing techniques which allow the creation of dry liquid concentrates which may be incorporated into rubber compositions in order to efficiently create rubber composites with dispersed, individualized, discrete carbon nanotubes. These new compositions and manufacturing techniques are useful in many applications, including dry liquid concentrates, which can then be used as an additive in the compounding and formulation of rubber composite for the improvement of mechanical, electrical and thermal properties.

The present invention could also utilize various solvents to allow the creation of dry liquid concentrates which may be incorporated into thermosets, like epoxies, or no/low VOC thermoset systems primarily comprised of an aqueous solution. This allows for the creation of thermoset composites with dispersed, individualized, discrete carbon nanotubes.

The solvent DLCs could also be used to create a composite of carbon nanotubes and transition metal oxides, improving electrical conductivity of the composition.

The discussed carbon nanotubes may be single, double, or multi-wall carbon nanotubes. The carbon nanotubes may or may not be oxidized on the interior and/or exterior surface and are not limited to any aspect ratio.

The carbon nanotubes discussed herein may be discrete, individualized carbon nanotubes having targeted, or selective, oxidation levels and/or content on the exterior and/or interior of the tube walls. Such carbon nanotubes may have little to no inner tube surface oxidation, or differing amounts and/or types of oxidation between the tubes' inner and outer surfaces. Such tubes are useful in many applications, including plasticizers, which can then be used as an additive in compounding and formulation of rubber, elastomeric, thermoplastic and thermoset composite for improvement of mechanical, electrical and thermal properties.

The discrete carbon nanotubes discussed herein may comprise an interior and exterior surface, each surface comprising an interior surface oxidized species content and an exterior surface oxidized species content, wherein the interior surface oxidized species content differs from the exterior surface oxidized species content by at least 20%, and as high as 100%, preferably wherein the interior surface oxidized species content is less than the exterior surface oxidized species content.

The interior surface oxidized species content can be up to 3 weight percent relative to carbon nanotube weight, preferably from about 0.01 to about 3 weight percent relative to carbon nanotube weight, more preferably from about 0.01 to about 2, most preferably from about 0.01 to about 1. Especially preferred interior surface oxidized species content is from zero to about 0.01 weight percent relative to carbon nanotube weight.

The exterior surface oxidized species content can be from about 1 to about 6 weight percent relative to carbon nanotube weight, preferably from about 1 to about 4, more preferably from about 1 to about 2 weight percent relative to carbon nanotube weight. This is determined by comparing the exterior oxidized species content for a given plurality of nanotubes against the total weight of that plurality of nanotubes.

The interior and exterior surface oxidized species content totals can be from about 1 to about 9 weight percent relative to carbon nanotube weight.

The discrete carbon nanotubes discussed herein may additionally or alternatively comprise an interior and exterior surface, each surface comprising an interior surface and an exterior surface oxidized species content, wherein the interior surface oxidized species content comprises from about 0.01 to less than about 1 percent relative to carbon nanotube weight and the exterior surface oxidized species content comprises more than about 1 to about 3 percent relative to carbon nanotube weight.

The carbon nanotubes discussed herein may comprise a plurality of open ended tubes. The carbon nanotubes of any composition or embodiment described herein are especially preferred wherein the inner and outer surface oxidation difference is at least about 0.2 weight percent.

DETAILED DESCRIPTION

Dry Liquid Concentrates

Figure 1:
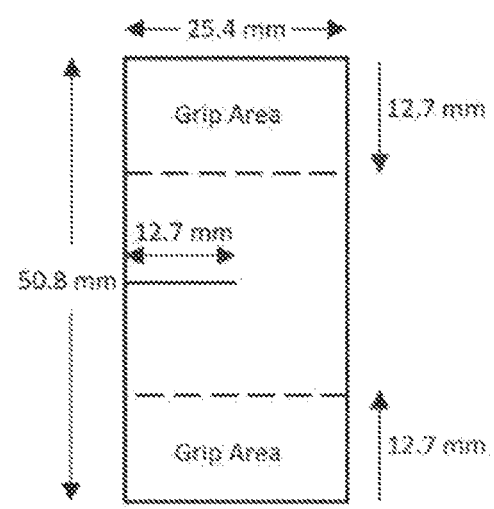
FIG. 1 shows an exemplary constrained tear test sample.

One embodiment of the present invention is a dry liquid concentrate ("DLC") comprising carbon nanotubes and rubber processing oils that disperses under typical compounding conditions into a rubber compound. The carbon nanotubes in a DLC are not dispersed but will disperse into rubber compounds and may also be useful for dispersing carbon nanotubes in other processing operations due to the method's lower energy requirements.

One aspect of the disclosed invention is that the carbon nanotubes in the DLC composition may be as-manufactured raw carbon nanotubes and do not need to be disentangled from their raw state prior to being formed into a DLC. Once in the DLC form, the carbon nanotubes can be disentangled and dispersed in the final rubber formulation. The nanotubes described herein can also be oxidized and/or functionalized, allowing for the addition of side chemical groups to the nanotube surfaces. This can also be done without the need for disentanglement prior to typical processing conditions, if the composition described herein is used.

Another embodiment of the present invention is a dry liquid concentrate ("DLC") comprising carbon nanotubes and at least one solvent(s) that disperses under typical mixing conditions into a thermoset composite system. The carbon nanotubes in a DLC are not dispersed, but are conditioned properly to disperse into these solvent-borne, including aqueous, thermoset composite systems. In some cases it is preferential to utilize a blend or mixture of solvents. To allow for typical processing equipment to individualize the nanotubes from this DLC, a surfactant could also be used in the composition. Most preferentially, the surfactant would be chosen from the following classes: anionic, cationic, non-ionic, and zwitterionic.

Another embodiment of the present invention is to use a solvent DLC to add carbon nanotubes to a solvent-borne mixture of transition metal oxide(s). Upon solvent removal, a resultant composite of carbon nanotubes and transition metal oxides is formed. The carbon nanotube DLC composition could also include a binder material comprising a thermoplastic material could be added to the composition. Some preferential thermoplastic binding materials include vinylidene fluoride, carboxymethyl cellulose, carboxy ethyl cellulose, acrylic acid, alkylacrylic acid, vinyl alcohol, vinyl acetate, vinylbutyral, sulfonated polystyrene, styrene-butadiene, and styrene-hydrogenated butadiene.

Raw CNTs can be used to create a dry-liquid concentrate and provide benefits in the final rubber compound. Oxidized and/or functionalized CNTs that are not dispersed can also be used to create a dry-liquid concentrate. Most preferentially, the functional side groups added to these oxidized nanoutubes are larger than 50 daltons in size. This surprising and unexpected result reduces manufacturing costs and difficulty. Previously used methods of disentangling carbon nanotubes are more energy intensive and more costly. The disclosed method maintains the same physical, electrical, and anti-corrosive property improvements. The resulting composition also maintains the same environmental health and safety ("EH&S") improvements as the previous methods of manufacturing a dry liquid concentrate which required carbon nanotubes to be disentangled prior to being incorporated into the DLC.

One exemplary method of creating the disclosed DLC involves mixing raw, as-manufactured carbon nanotubes in de-ionized water and heating to 65 degrees Celsius while stirring with overhead stirring and a high shear blade. Oil is added to the water/CNT solution upon reaching the desired temperature and the solution is allowed to mix until phase separation occurs. Once phase separation occurs, the carbon nanotubes will be contained in the oil layer. When the carbon nanotube/oil layer separates from the water layer, the water may be filtered out and the resulting oil/CNT composition may be dried in an oven. A preferred remaining water content in this final composition of oil/CNT is less than 1 wt %, as measured by thermogravimetric analysis.

A similar exemplary method substitutes the oil in the above method for at least one solvent. That solvent then contains the carbon nanotubes at the end of the method, resulting in a solvent/CNT composition. Preferably, two or more different solvents may be employed in the mixture, wherein the solvents may be used in approximately equal amounts, or wherein one solvent may comprise the majority of the solvent mixture.

The concentration of CNTs in de-ionized water should not exceed about 1.8% by weight. Surprisingly, the overhead mixing used may be of a lower shear force than is traditionally required to disperse or disentangle the CNTs within the water or oil solution. Other concentrations of CNTs in de-ionized water can be utilized, depending primarily upon the type of carbon nanotubes used, and the viscosity of the DLC medium-oil or solvent.

Embodiments of the DLC composition may comprise as little as 5% by weight, or as little as 10% by weight, or as little as 15% by weight carbon nanotubes. Preferred embodiments of the disclosed DLC composition comprise about 20% by weight of carbon nanotubes. Embodiments of the DLC composition may comprise as much as 25% by weight, as much as 30% by weight, as much as 35% by weight, as much as 40% by weight, as much as 50% by weight of carbon nanotubes. Depending upon the exact medium of DLC and nature of carbon nanotubes utilized, higher concentrations of carbon nanotubes can be beneficial. The remainder of the DLC composition is substantially composed of rubber processing oils or solvent(s). The ratio of carbon nanotubes to oil impacts the resulting product and its properties. Rubber process oil may include, for example, TOTM oil, TP-95, HyPrene 100 naphthenic oil, castor oil, carnauba wax, curing co-agents, and/or sebacates.

Acid and Multi-Wall Carbon Nanotube (CNT) Loading

CNT is usually shipped in bulk sea containers and unloaded at the processing site. Boxes or containers of CNT bags often have inner plastic liners to facilitate the prevention of CNTs escaping. The boxes are typically unloaded in a High efficiency particulate air (HEPA) filtered closed environment and bags may be passed through a wall opening to a bag emptying room.

In the bag emptying room, to prevent CNT exposure, CNT bags are typically loaded into an air tight hopper and accessed by personnel from outside the hopper by means of gloves, similar to a sand/bead blasting glove box. The hopper is usually equipped with an external HEPA vacuum that can be turned on while the CNT bags are loaded into the hopper. The HEPA filter can then be turned off before the bags are opened inside the hopper to prevent excessive amounts of CNT from entering the filter. A double diaphragm powder pump may be conveniently used to load the CNT from the hopper to the reactor and a Coriolis mass meter may be employed to ensure proper acid loading. The acid is typically at a temperature of between 95 and 110° C.

Alternatively, CNT loading and packaging for large scale production may be accomplished by receiving CNT in, for example, cone bottom stainless steel containers or other reusable containers equipped with split butterfly valves. The container then can be attached to a loading system with mating butterfly valve and intermediate extraction zone that is vacuum evacuated or exhausted between valves to insure <0.7 microgram/m$^3$ exposure. This stream may then be filtered through a HEPA filtration system.

General Process to Produce Discrete Carbon Nanotubes Having Targeted Oxidation

A mixture of 0.5% to 5% carbon nanotubes, preferably 3%, by weight is prepared with CNano grade Flotube 9000 carbon nanotubes and 65% nitric acid. While stirring, the acid and carbon nanotube mixture is heated to 70 to 90 degrees C. for 2 to 4 hours. The formed oxidized carbon nanotubes are then isolated from the acid mixture. Several methods can be used to isolate the oxidized carbon nanotubes, including but not limited to centrifugation, filtration, mechanical expression, decanting and other solid-liquid separation techniques. The residual acid is then removed by washing the oxidized carbon nanotubes with an aqueous medium such as water, preferably deionized water, to a pH of 3 to 4. The carbon nanotubes are then suspended in water at a concentration of 0.5% to 4%, preferably 1.5% by weight. The solution is subjected to intensely disruptive forces generated by shear (turbulent) and/or cavitation with process equipment capable of producing energy densities of 106 to 108 Joules/m$^3$. Equipment that meet this specification includes but is not limited to ultrasonicators, cavitators, mechanical homogenizers, pressure homogenizers and microfluidizers (Table 1). One such homogenizer is shown in U.S. Patent 756,953, the disclosure of which is incorporated herein by reference. Other shearing type equipment that may be useful include, for example, tangential type mixer, intermeshing type mixer, 2 roll mill, calendaring mill, and a screw type extruder like a Haake or Brabender extruder, or combination thereof. After shear processing, the oxidized carbon nanotubes are discrete and individualized carbon nanotubes. Typically, based on a given starting amount of entangled as-received and as-made carbon nanotubes, a plurality of discrete oxidized carbon nanotubes results from this process, preferably at least about 60%, more preferably at least about 75%, most preferably at least about 95% and as high as 100%, with the minority of the tubes, usually the vast minority of the tubes remaining entangled, or not fully individualized.

Another illustrative process for producing discrete carbon nanotubes follows: A mixture of 0.5% to 5% carbon nanotubes, preferably 3%, by weight is prepared with CNano Flotube 9000 grade carbon nanotubes and an acid mixture that consists of 3 parts by weight of sulfuric acid (97% sulfuric acid and 3% water) and 1 part by weight of nitric acid (65-70 percent nitric acid). The mixture is held at room temperature while stirring for 3-4 hours. The formed oxidized carbon nanotubes are then isolated from the acid mixture. Several methods can be used to isolate the oxidized carbon nanotubes, including but not limited to centrifugation, filtration, mechanical expression, decanting and other solid-liquid separation techniques. The acid is then removed by washing the oxidized carbon nanotubes with an aqueous medium, such as water, preferably deionized water, to a pH of 3 to 4. The oxidized carbon nanotubes are then suspended in water at a concentration of 0.5% to 4%, preferably 1.5% by weight. The solution is subjected to intensely disruptive forces generated by shear (turbulent) and/or cavitation with process equipment capable of producing energy densities of $10^6$ to $10^8$ Joules/m$^3$. Equipment that meet this specification includes but is not limited to ultrasonicators, cavitators mechanical homogenizers, pressure homogenizers and microfluidizers (Table 1). After shear and/or cavitation processing, the oxidized carbon nanotubes become oxidized, discrete carbon nanotubes. Typically, based on a given starting amount of entangled as-received and as-made carbon nanotubes, a plurality of discrete oxidized carbon nanotubes results from this process, preferably at least about 60%, more preferably at least about 75%, most preferably at least about 95% and as high as 100%, with the minority of the tubes, usually the vast minority of the tubes remaining entangled, or not fully individualized.

Example 1: Entangled Oxidized as MWCNT-3 Hour (oMWCNT-3)

One hundred milliliters of >64% nitric acid is heated to 85 degrees C. To the acid, 3 grams of as-received, multi-walled carbon nanotubes (C9000, CNano Technology) are added. The as-received tubes have the morphology of entangled balls of wool. The mixture of acid and carbon nanotubes are mixed while the solution is kept at 85 degrees for 3 hours and is labeled "oMWCNT-3". At the end of the reaction period, the oMWCNT-3 are filtered to remove the acid and washed with reverse osmosis (RO) water to pH of 3-4. After acid treatment, the carbon nanotubes are still entangled balls. The tubes are dried at 60° C. to constant weight.

Example 2: Entangled Oxidized as MWCNT-6 Hour (oMWCNT-6)

One hundred milliliters of >64% nitric acid is heated to 85 degrees C. To the acid, 3 grams of as-received, multi-walled carbon nanotubes (C9000, CNano Technology) are added. The as-received tubes have the morphology of entangled balls of wool. The mixture of acid and carbon nanotubes are mixed while the solution is kept at 85 degrees for 6 hours and is labeled "oMWCNT-6". At the end of the reaction period, the oMWCNT-6 are filtered to remove the acid and washed with reverse osmosis (RO) water to pH of 3-4. After acid treatment, the carbon nanotubes are still entangled balls. The tubes are dried at 60° C. to constant weight.

Example 3: Discrete Carbon Nanotube—Oxidize Outermost Wall (Out-dMWCNT)

In a vessel, 922 kilograms of 64% nitric acid is heated to 83° C. To the acid, 20 kilograms of as received, multi-walled carbon nanotubes (C9000, CNano Technology) is added. The mixture is mixed and kept at 83° C. for 3 hours. After the 3 hours, the acid is removed by filtration and the carbon nanotubes washed with RO water to pH of 3-4. After acid treatment, the carbon nanotubes are still entangled balls with few open ends. While the outside of the tube is oxidized forming a variety of oxidized species, the inside of the nanotubes have little exposure to acid and therefore little oxidization. The oxidized carbon nanotubes are then suspended in RO water at a concentration of 1.5% by weight.

The RO water and oxidized tangled nanotubes solution is subjected to intensely disruptive forces generated by shear (turbulent) and/or cavitation with process equipment capable of producing energy densities of $10^6$ to $10^8$ Joules/$m^3$. The resulting sample is labeled "out-dMWCNT" which represents outer wall oxidized and "d" as discrete. Equipment that meet this shear includes but is not limited to ultrasonicators, cavitators, mechanical homogenizers, pressure homogenizers, and microfluidizers (Table 1). It is believed that the shear and/or cavitation processing detangles and discretizes the oxidized carbon nanotubes through mechanical means that result in tube breaking and opening of the ends due to breakage particularly at defects in the CNT structure which is normally a 6 member carbon rings. Defects happen at places in the tube which are not 6 member carbon rings. As this is done in water, no oxidation occurs in the interior surface of the discrete carbon nanotubes.

Example 4: Discrete Carbon Nanotube—Oxidized Outer and Inner Wall (Out/In-dMWCNT)

To oxidize the interior of the discrete carbon nanotubes, 3 grams of the out-dMWCNT is added to 64% nitric acid heated to 85° C. The solution is mixed and kept at temperature for 3 hours. During this time, the nitric acid oxidizes the interior surface of the carbon nanotubes. At the end of 3 hours, the tubes are filtered to remove the acid and then washed to pH of 3-4 with RO water. This sample is labeled "out/in-dMWCNT" representing both outer and inner wall oxidation and "d" as discrete.

Oxidation of the samples of carbon nanotubes is determined using a thermogravimetric analysis method. In this example, a TA Instruments Q50 Thermogravimetric Analyzer (TGA) is used. Samples of dried carbon nanotubes are ground using a vibration ball mill. Into a tared platinum pan of the TGA, 7-15 mg of ground carbon nanotubes are added. The measurement protocol is as follows. In a nitrogen environment, the temperature is ramped from room temperature up to 100° C. at a rate of 10° C. per minute and held at this temperature for 45 minutes to allow for the removal of residual water. Next the temperature is increased to 700° C. at a rate of 5° C. per minute. During this process the weight percent change is recorded as a function of temperature and time. All values are normalized for any change associated with residual water removal during the 100° C. isotherm. The percent of oxygen by weight of carbon nanotubes (% Ox) is determined by subtracting the percent weight change at 600° C. from the percent weight change at 200° C.

A comparative table (Table 2 below) shows the levels of oxidation of different batches of carbon nanotubes that have been oxidized either just on the outside (Batch 1, Batch 2, and Batch 3), or on both the outside and inside (Batch 4). Batch 1 (oMWCNT-3 as made in Example 1 above) is a batch of entangled carbon nanotubes that are oxidized on the outside only when the batch is still in an entangled form (Table 2, first column). Batch 2 (oMWCNT-6 as made in Example 2 above) is also a batch of entangled carbon nanotubes that are oxidized on the outside only when the batch is still in an entangled form (Table 2, second column). The average percent oxidation of Batch 1 (2.04% Ox) and Batch 2 (2.06% Ox) are essentially the same. Since the difference between Batch 1 (three hour exposure to acid) and Batch 2 (six hour exposure to acid) is that the carbon nanotubes were exposed to acid for twice as long a time in Batch 2, this indicates that additional exposure to acid does not increase the amount of oxidation on the surface of the carbon nanotubes.

Batch 3 (Out-dMWCNT as made in Example 3 above) is a batch of entangled carbon nanotubes that were oxidized on the outside only when the batch was still in an entangled form (Table 2, third column). Batch 3 was then been made into a discrete batch of carbon nanotubes without any further oxidation. Batch 3 serves as a control sample for the effects on oxidation of rendering entangled carbon nanotubes into discrete nanotubes. Batch 3 shows essentially the same average oxidation level (1.99% Ox) as Batch 1 and Batch 2. Therefore, Batch 3 shows that detangling the carbon nanotubes and making them discrete in water opens the ends of the tubes without oxidizing the interior.

Finally, Batch 4 (Out/In-dMWCNT as made in this Example 4 herein) is a batch of entangled carbon nanotubes that are oxidized on the outside when the batch is still in an entangled form, and then oxidized again after the batch has then been made into a discrete batch of carbon nanotubes (Table 2, fourth column). Because the discrete carbon nanotubes are open ended, in Batch 4 acid enters the interior of the tubes and oxidizes the inner surface. Batch 4 shows a significantly elevated level of average oxidation (2.3900 Ox) compared to Batch 1, Batch 2 and Batch 3. The significant elevation in the average oxidation level in Batch 4 represents the additional oxidation of the carbon nanotubes on their inner surface. Thus, the average oxidation level for Batch 4 (2.39% Ox) is about 20% higher than the average oxidation levels of Batch 3 (1.990% Ox). In Table 2 below, the average value of the oxidation is shown in replicate for the four batches of tubes. The percent oxidation is within the standard deviation for Batch 1, Batch 2 and Batch 3.

TABLE 1

| Homogenizer Type | Flow Regime | Energy Density (J-m$^{-3}$) |
|---|---|---|
| Stirred tanks | turbulent inertial, turbulent viscous, laminar viscous | $10^3$-$10^6$ |
| Colloid mil | laminar viscous, turbulent viscous | $10^3$-$10^8$ |
| Toothed-disc disperser | turbulent viscous | $10^3$-$10^8$ |
| High pressure homogenizer | turbulent inertial, turbulent viscous, cavitation inertial, laminar viscous | $10^6$-$10^8$ |
| Ultrasonic probe | cavitation inertial | $10^6$-$10^8$ |
| Ultrasonic jet | cavitation inertial | $10^6$-$10^8$ |
| Microfluidization | turbulent inertial, turbulent viscous | $10^6$-$10^8$ |
| Membrane and microchannel Injection | spontaneous transformation based | Low $10^3$ |

Excerpted from *Engineering Aspects of Food Emulsification and Homogenization*, ed. M. Rayner and P. Dejmek, CRC Press, New York 2015.

TABLE 2

Percent oxidation by weight of carbon nanotubes.

|  | Batch 1: oMWCNT- 3% Ox | Batch 2: oMWCNT- 6% Ox | Batch 3: Out- dMWCNT % Ox | Batch 4: Out/In- dMWCNT % Ox | Difference in % Ox Batch 4- Batch 3 | *0% difference in % Ox (Batch 4 v Batch 3) |
|---|---|---|---|---|---|---|
|  | 1.92 | 1.94 | 2.067 | 2.42 | 0.353 | 17% |
|  | 2.01 | 2.18 | 1.897 | 2.40 | 0.503 | 26.5% |
|  | 2.18 | NM | 2.12 | 2.36 | 0.24 | 11% |
|  | 2.05 | NM | 1.85 | NM | n/a | n/a |
| Average | 2.04 | 2.06 | 1.99 | 2.39 | 0.4 | 20% |
| St. Dev. | 0.108 | 0.169 | 0.130 | 0.030 | n/a | n/a |

NM = Not Measured
*% difference between interior and exterior oxidation surfaces (Batch 4 v Batch 3) = (((outside % oxidation) − (inside % oxidation)) ÷ (outside % oxidation)) × 100

An illustrative process to form a composition comprising discrete carbon nanotubes in a plasticizer is to first select a plurality of discrete carbon nanotubes having an average aspect ratio of from about 10 to about 500, and an oxidative species content total level from about 1 to about 15% by weight. Then the discrete carbon nanotubes are suspended using shear in water at a nanotube concentration from about 1% to about 10% by weight to form the nanotube water slurry. The slurry is then mixed with at least one plasticizer at a temperature from about 30° C. to about 100° C. for sufficient time that the carbon nanotubes migrate from the water to the plasticizer to form a water nanotube/plasticizer mixer. The mixture can comprise from 70% to about 99.9% water. The bulk of the water is separated from the mixture by filtration, decanting or other means of mechanical separation. The filtered material can contain from about 50% to about 10% water. The filtered material is then dried at a temperature from about 40° C. to about 120° C. to form an anhydrous nanotube/plasticizer mixture with less than 3% water, most preferably less than 0.5% water by weight and for some applications 0% water by weight.

Example 5

A concentrate of discrete carbon nanotubes in water with only the exterior wall oxidized as in Example 3 is diluted to a 2% by weight in deionized water. The slurry is heated to 40° C. while stirring with an overhead stirrer at 400 rpm. For every gram of discrete carbon nanotubes, 4 grams of TOTM (trioctyl trimellitate) from Sigma Aldrich is added to the stirring mixture. For 4 hours, the mixture is stirred at 750 rpm and kept at 40° C. During this time, the oil and discrete carbon nanotubes floats to the top, leaving clear water at the bottom. When this occurs, the water is separated from the TOTM/carbon nanotube mixture by filtration. The TOTM and discrete carbon nanotubes are dried in a forced air convection oven at 70° C. until residual water is removed. The result is a flowable powder. The concentration of discrete carbon nanotubes is determined by thermogravimetric means and found to be 20% discrete carbon nanotubes and 80% TOTM.

Example 6

The discrete carbon nanotubes and plasticizer composition of Example 5 comprising 20% discrete carbon nanotubes and 80% TOTM (trioctyle trimellitate) is added at concentrations of 2 parts per hundred resin (phr) and 3 parts per hundred resin (phr) to a nitrile rubber formulation (Table 3). The oil concentration of the compounds is adjusted to compensate for the additional oil from the composition of this invention. The compound is then cured into plaques for testing. Constrained tear testing is performed using an Instron tensiometer. Constrained tear samples are punched out using a die, making a rectangle 1.5 inches by 1 inch by 1 inch with a specimen-centered notch ½ inch long, sliced perpendicular to the longest dimension. The specimen is gripped equal distance from the notch and pulled by the Instron. Shear strain and stress is recorded and the area under the stress-strain curve from strain zero to the final failure is measured. This area is the total tear energy. The results in Table 4 indicate that an increase in tear strength is imparted by the discrete carbon nanotubes.

TABLE 3

| Ingredient | Control | 2 phr dCNT | 3 phr dCNT |
|---|---|---|---|
| Nitrile Rubber (Nipol 3640S) | 100 | 100 | 100 |
| 20% dCNT in TOTM | 0 | 10 | 15 |
| N774 Carbon Black | 80 | 75 | 75 |
| Polyester sebacate plasticizer (Paraplex G-25) | 15 | 7 | 3 |
| Coumarone Indene Resin (Cumar P25) | 10 | 10 | 10 |
| Stearic Acid | 1 | 1 | 1 |
| Zinc Oxide (Kadox 911) | 5 | 5 | 5 |
| Antioxidant (Vanox CDPA) | 2 | 2 | 2 |
| Antioxidant (Santoflex 6PPD) | 2 | 2 | 2 |
| High molecular fatty acid esters (Struktol WB212) | 2 | 2 | 2 |
| Accelerator DTDM | 2 | 2 | 2 |
| Accelerator (Morfax) | 2.26 | 2.26 | 2.26 |
| Accelerator TMTM | 1 | 1 | 1 |

TABLE 4

| Description | Constrained Tear (psi) |
|---|---|
| Control | 482 |
| 2 phr dCNT | 537 |
| 3 phr dCNT | 574 |

Example 7

The discrete carbon nanotubes and plasticizer composition of Example 5 comprising 20% discrete carbon nanotubes and 80% TOTM (trioctyle trimellitate) is added at concentrations 3 parts per hundred resin (phr) to a nitrile rubber formulation (Table 5). The oil concentration of the compound is adjusted to compensate for the additional oil from the composition of this invention so that all formulations have equivalent oil concentrations. A comparative compound is prepared with carbon nanotubes as received (Flotube C9000, CNano) (Table 5). Carbon black content is adjusted so that the measured hardness is the same for the three samples. The Shore A hardness is 67 for the control and 67 for the 3 phr CNT of this invention and 68 for the 3 phr "As is" carbon nanotubes (C9000). The constrained tear is measured as described in Example 6. The discrete carbon nanotubes and oil composition (dCNT) of this invention have higher total tear energy than the entangled carbon nanotubes (C9000) and the control. The tear energy of entangled carbon nanotubes, C9000, is worse than the control. (Table 6)

TABLE 5

| Ingredient | Control | 3 phr dCNT | 3 phr C9000 |
|---|---|---|---|
| Nitrile Rubber (Nipol 3640S) | 100 | 100 | 100 |
| 20% dCNT in TOTM | 0 | 15 | 0 |
| MWCNT as received (C9000, CNano) | 0 | 0 | 3 |
| N774 Carbon Black | 80 | 75 | 75 |
| Polyester sebacate plasticizer (Paraplex G-25) | 15 | 3 | 15 |
| Coumarone Indene Resin (Cumar P25) | 10 | 10 | 10 |
| Stearic Acid | 1 | 1 | 1 |
| Zinc Oxide (Kadox 911) | 5 | 5 | 5 |
| Antioxidant (Vanox CDPA) | 2 | 2 | 2 |
| Antioxidant (Santoflex 6PPD) | 2 | 2 | 2 |
| High molecular fatty acid esters (Struktol WB212) | 2 | 2 | 2 |
| Accelerator DTDM | 2 | 2 | 2 |
| Accelerator (Morfax) | 2.26 | 2.26 | 2.26 |
| Accelerator TMTM | 1 | 1 | 1 |

TABLE 6

| Description | Constrained Tear (psi) |
|---|---|
| Control | 482 |
| 3 phr dCNT | 574 |
| 3 phr C9000 | 394 |

It is known to those practiced in the art that the addition of filler to a rubber compound will increase the viscosity of the compound. Unexpectedly, the addition of discrete carbon nanotube and oil mixture from Example 7 did not increase the viscosity but instead decreased viscosity, while the entangled carbon nanotubes of Example 7 (C9000) increased the viscosity. The viscosity is measured using a Mooney Rheometer at 125° C. The initial viscosity measured is descriptive of the processability of the compound. The compound containing the discrete carbon nanotubes of this invention and described in Example 7 is found to be equal to the control while the compound containing the entangled carbon nanotubes (C9000) is found to be higher than the control (Table 7).

TABLE 7

| Description | Minimum Mooney Viscosity ML(1 + 30) |
|---|---|
| Control | 23.1 |
| 3 phr dCNT | 23.1 |
| 3 phr C9000 | 26.6 |

Example 8

A concentrate of multiwall carbon nanotubes, grade C9100 from CNano, in water is diluted to a 2% by weight in deionized water. The slurry is heated to 40° C. while stirring with an overhead stirrer at 400 rpm. Four different samples are produced following the procedure outlined below, with resultant DLCs having the concentrations of CNTs to oil as outlined in Table 8. Appropriate quantities of oil, in this example HyPrene L150 heavy naphthenic oil, are added to the stirring mixture based on the ratios outlined in Table 8. For 4 hours, the mixture is stirred at 750 rpm and kept at 40° C. During this time, the oil and discrete carbon nanotubes floats to the top, leaving clear water at the bottom. When this occurs, the water is separated from the naphthenic oil/carbon nanotube mixture by filtration. The naphthenic oil and discrete carbon nanotubes are dried in a forced air convection oven at 70° C. until residual water is removed. The result is a flowable powder. The concentration of discrete carbon nanotubes is verified by thermogravimetric means and found to be within +/−1.5 wt % of those ranges specified in Table 8.

TABLE 8

| Sample Nomenclature | Wt % CNTs (C9100) | Wt % Oil (HyPrene L150 Heavy Naphthenic) |
|---|---|---|
| DLC 60:40 | 60 | 40 |
| DLC 70:30 | 70 | 30 |
| DLC 80:20 | 80 | 20 |
| DLC 90:10 | 90 | 10 |

Example 9

The four samples produced in Example 8 are used to reinforce an off-the-road (OTR) tire tread compound comprising a blend of natural and polybutadiene rubber. The four samples are used to produce equivalent concentrations of carbon nanotubes in the final compound, with other ingredients proportionally adjusted for the additional carrier oil. The experimental formulas are shown in Table 9.

TABLE 9

| Material | Mix Step | +3CNT −8CB (using DLC 60:40) PHR | +3CNT −8CB (using DLC 70:30) PHR | +3CNT −8CB (using DLC 80:20) PHR | +3CNT −8CB (using DLC 90:10) PHR |
| --- | --- | --- | --- | --- | --- |
| Natural Rubber | 1 | 70 | 70 | 70 | 70 |
| PBR-Cisamer 1220 | 1 | 30 | 30 | 30 | 30 |
| DLC 60:40 | 1 | 5 | | 0 | 0 |
| DLC 70:30 | 1 | | 4.3 | | |
| DLC 80:20 | 1 | | | 3.75 | |
| DLC 90:10 | 1 | | | | 3.33 |
| Carbon Black N234 | 1 | 57 | 57 | 57 | 57 |
| HyPrene 150 Napth Oil | 1 | 13 | 13.7 | 14.25 | 14.67 |
| Zinc Oxide | 1 | 4 | 4 | 4 | 4 |
| Stearic Acid | 1 | 3 | 3 | 3 | 3 |
| Antioxidant 6PPD | 1 | 2.5 | 2.5 | 2.5 | 2.5 |
| Microcrystalline Wax | 1 | 2 | 2 | 2 | 2 |
| Accelerator TBBS | 2 | 1 | 1 | 1 | 1 |
| Sulfur | 2 | 1.5 | 1.5 | 1.5 | 1.5 |

After mixing using a typical 4-minute first pass and 2-minute second pass methodology in an internal tangential mixer, the compounds are cured for time t90+5 minutes into test pucks for cut & chip testing. After a 16+ hour rest period, the pucks are tested for cut & chip (C&C) volume loss, with results shown in Table 10. Lower volume loss is preferential, as it correlates to longer lifetime and less particle wear in off-the-road conditions.

TABLE 10

| | +3 CNT −8 CB (60:40) | +3CNT −8CB (70:30) | +3CNT −8CB (80:20) | +3CNT −8CB (90:10) |
| --- | --- | --- | --- | --- |
| Cut & Chip Volume Loss (ml) | 0.644 | 0.721 | 0.736 | 0.785 |

Figure 16:
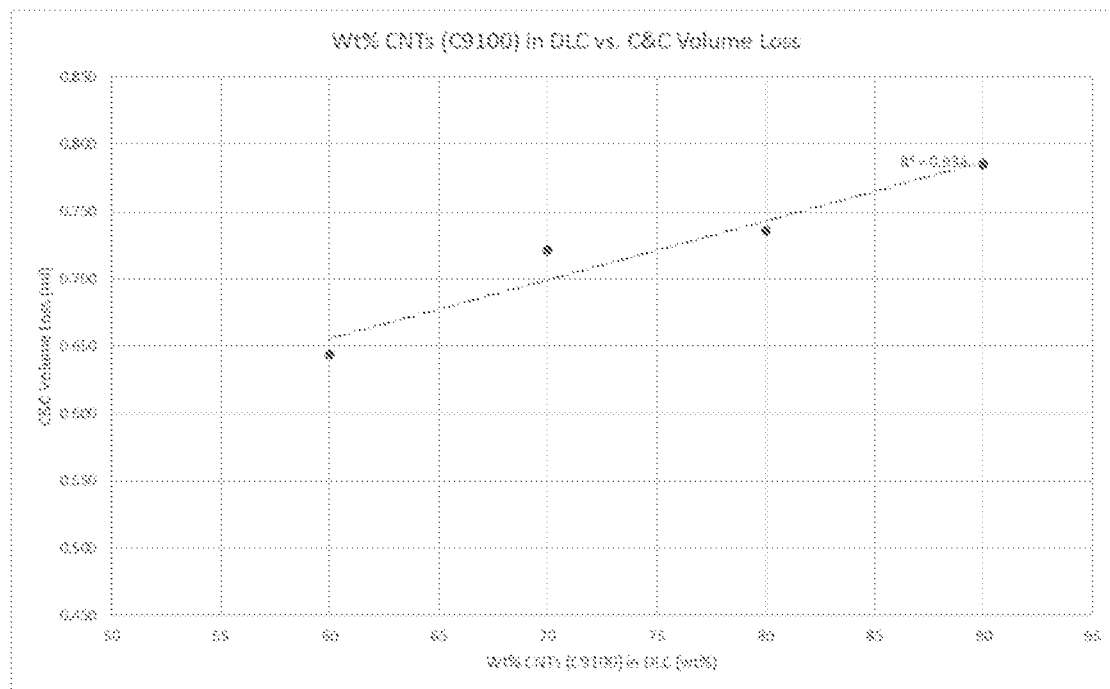
FIG. 16 shows a graphical representation of the correlation between tensile strength and wt % CNT (C9100) dispersed via DLC.

Reviewing the results in Table 10, a preferential loading of multiwall nanotubes, in this case C9100 from CNano, is found to be 60 wt % MWCNTs and 40 wt % Hyprene L150 naphthenic oil as produced using the process described above. A correlation exists as a linear function with R2=0.934 when wt % CNTs in the DLC is plotted vs. C&C volume loss, as shown in FIG. 16.

Disclosed embodiments may also relate to a composition useful for treating and/or remediating contaminated soil, groundwater and/or wastewater by treating, removing, modifying, sequestering, targeting labeling, and/or breaking down at least a portion of any dry cleaning compounds and related compounds such as perchloroethene (PCE), trichloroethene (TCE), 1,2-dichloroethene (DCE), vinyl chloride, and/or ethane. Embodiments may also relate to compounds useful for treating, removing, modifying, sequestering, targeting labeling, and/or breaking down at least a portion of any oils, hazardous or undesirable chemicals, and other contaminants. Disclosed embodiments may comprise a plurality of discrete carbon nanotubes, wherein the discrete carbon nanotubes comprise an interior and exterior surface. Each surface may comprise an interior surface oxidized species content and/or an exterior surface oxidized species content. Embodiments may also comprise at least one degradative or otherwise chemically active molecule that is attached on either the interior or the exterior surface of the plurality of discrete carbon nanotubes. Such embodiments may be used in order to deliver known degrative and/or chemically active molecules to the location of any contaminated soil, groundwater and/or wastewater.

Carbon Nanotubes in Rubbers and Elastomers

The disclosed DLC has been used to incorporate carbon nanotubes into various rubbers and rubber formulations. The use of standard rubber processing techniques leads to discrete, individualized carbon nanotubes being dispersed within the rubber when the disclosed DLC is incorporated as described. Several DLC formulations were developed and tested with various rubber compositions.

Exemplary DLC compositions include MR 1020 DLC which comprises about 20 wt % functionalized and discrete CNTs in about 80 wt % Trioctyl Trimellitate oil ("TOTM"); MR 1120 DLC which comprises about 20 wt % functionalized and discrete CNTs in about 80 wt % Dibutoxyethoxyethyl Adipate oil ("TP-95"); MR 1030 DLC which comprises about 30 wt % funtionalized and discrete CNTs in about 70 wt % TOTM oil; and MR 1130 DLC which comprises about 30 wt % functionalized and discrete CNTs in about 70 wt % TP-95 oil. It will be understood that the carbon nanotube content within a rubber formulation is the result of both the type and amount of DLC included in the rubber formulation and that the incorporation of the disclosed DLC can increase not only the carbon nanotube content of the rubber formulation but also the associated oil content in the rubber formulation.

Nitrile Butadiene Rubber Formulations

Several formulations of nitrile butadiene rubber (NBR) were tested in order to determine the effects of incorporating carbon nanotubes through the disclosed DLC technology. The general composition of these NBR formulations are described in Table 8 below:

TABLE 11

Nitrile Butadiene Rubber Formulations

| Formulation Name | Carbon Black Content | Carbon Nanotube Content | Oil Content & Type |
| --- | --- | --- | --- |
| 72A | 80 phr | 0 | 12 phr TOTM |
| 72B | 75 phr | 3 phr CNT 1020 DLC | 12 phr TOTM |
| 72D | 75 phr | 3 phr CNT 1120 DLC | 12 phr TP-95 |
| 72E | 75 phr | 3 phr CNT 1030 DLC | 12 phr TOTM |
| 72F | 75 phr | 3 phr CNT 1130 DLC | 12 phr TP-95 |
| 72I | 75 phr | 3 phr CNT 1020 DLC | 12 phr TOTM |

Figure 10:
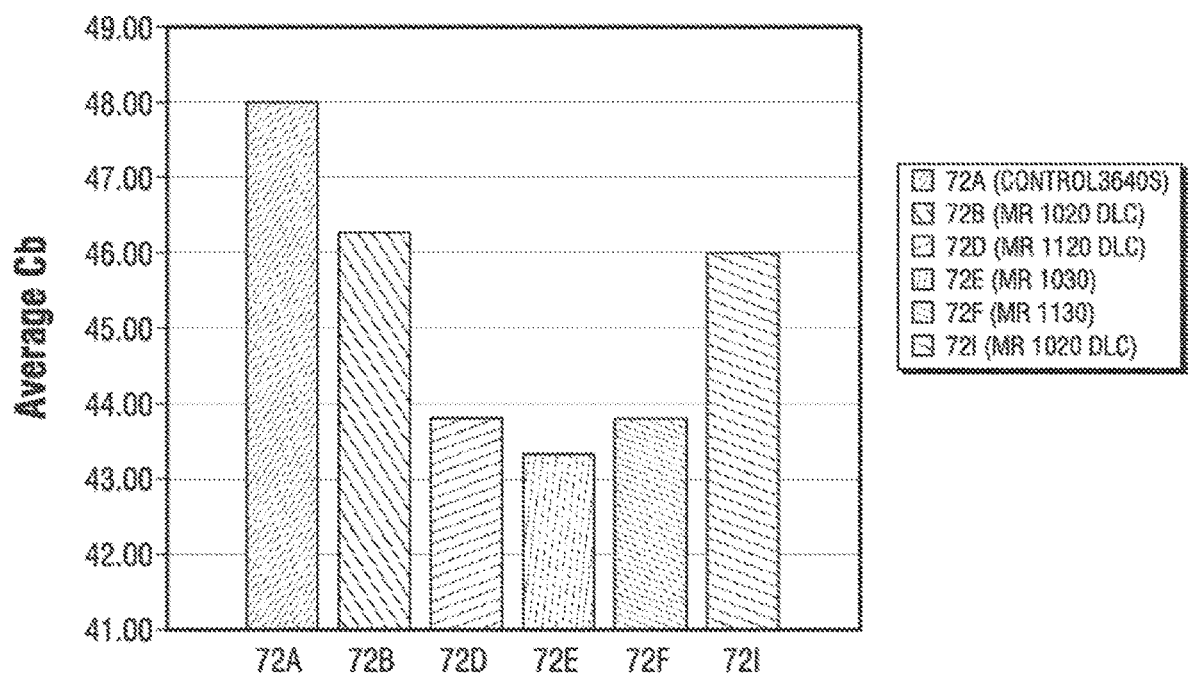
FIG. 10 shows a graph of compression set test results.

The resulting rubber formulations were tested using ASTM D395B Compression Set. In general, a lower compression set ("Compression B" or "Cb") is regarded as being better. The incorporation of carbon nanotubes is shown to provide lower compression set across the board in all samples. The results are shown in FIG. 10.

Some of these formulations were also subjected to a Constrained Tear Test. The Constrained Tear Test subjects a sample to a tensile force as a pull rate of 50 mm/minute. Samples are pre-cut with a 12.7 mm (½") notch as shown in FIG. 1.

Figure 11:
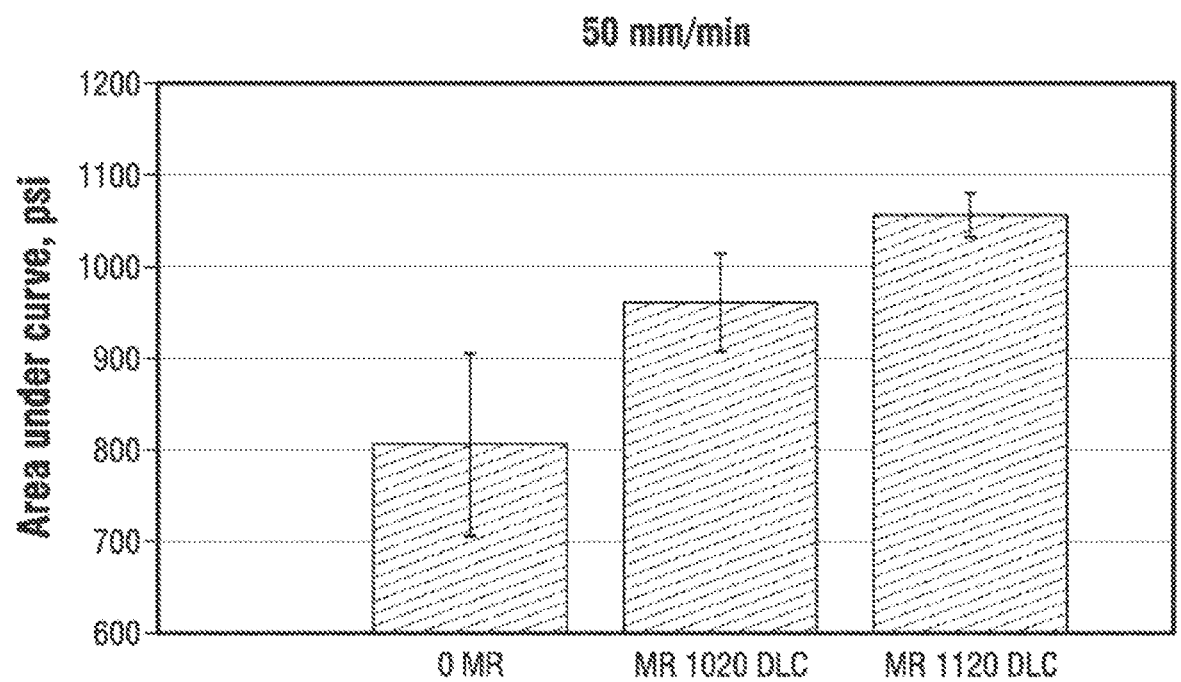
FIG. 11 shows a graph of constrained tear test results.

The Constrained Tear Test measures the amount of energy required for a tear to propagate entirely through a sample. The results of the Constrained Tear Test as shown in FIG. 11.

Figure 2:
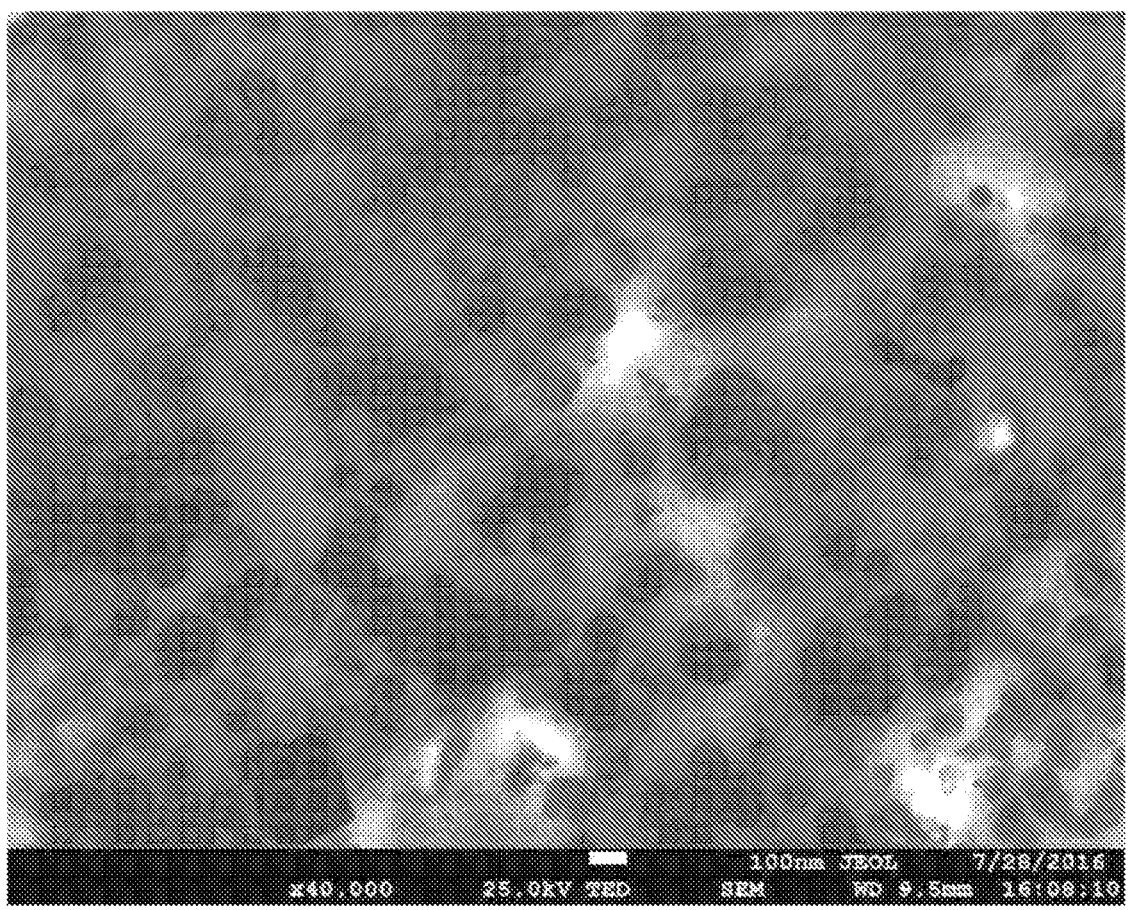
FIG. 2 shows a TEM image of a sample of NBR Formulation 72B.

In order to ensure dispersion of the carbon nanotubes in a sample of NBR formed using the disclosed DLC technology, a Transmission electron microscopy (TEM) images was taken of a sample of NBR formulation 72B identified above. As can be seen in FIG. 2, discrete, non-agglomerated, individualized carbon nanotubes are dispersed throughout the sample.

Hydrogenated Nitrile Butadiene Rubber Formulations

Multiple formulations of Hydrogenated Nitrile Butadiene Rubber ("HNBR") were formed using the MR 1020 DLC composition described above. Additionally, one formulation containing MR 1020 DLC and a control containing no carbon nanotubes were created using both a Banbury mixer and a 2 Roll mill mixer in order to test the effects mixing may have on the resulting sample. The general composition of these NBR formulations are described in Tables 12 (Banbury Mixer) and 13 (Roll Mill Mixer) below:

TABLE 12

Hydrogenated Nitrile Butadiene Rubber Formulations using a Banbury Mixer:

| Banbury Mixer | Sample 1 Control | Sample 2 2 phr MR | Sample 3 3 phr MR | Sample 4 4 phr MR |
| --- | --- | --- | --- | --- |
| Zetpol 2020 | 100 | 100 | 100 | 100 |
| N550 | 50 | 50 | 50 | 50 |
| MR 1020 DLC | 0 | 10 | 15 | 20 |
| Kadox 911C | 5 | 5 | 5 | 5 |
| Plasthall TOTM | 8 | 0 | 0 | 0 |
| Stearic Acid | 0.5 | 0.5 | 0.5 | 0.5 |
| Naugard 445 | 1.5 | 1.5 | 1.5 | 1.5 |
| Vanox ZMTI | 1 | 1 | 1 | 1 |
| Varox 802-40KE | 8 | 8 | 8 | 8 |

TABLE 13

Hydrogenated Nitrile Butadiene Rubber Formulations using a Roll Mill Mixer

| Roll Mill | Sample 5 Control | Sample 6 2 phr MR |
| --- | --- | --- |
| Zetpol 2020 | 100 | 100 |
| N550 | 50 | 50 |
| MR 1020 DLC | 0 | 10 |
| Kadox 911C | 5 | 5 |
| Plasthall TOTM | 8 | 0 |
| Stearic Acid | 0.5 | 0.5 |
| Naugard 445 | 1.5 | 1.5 |
| Vanox ZMTI | 1 | 1 |
| Varox 802-40KE | 8 | 8 |

It will be understood that the ingredients in the formulations described above are exemplary. An ordinary artisan will understand that similar ingredients may be obtained from other companies under different trade names but the chemical composition will be substantially similar.

A series of performance tests were performed on HNBR formulations 1-6 described above. The results of these tests show that adding carbon nanotubes to the rubber formulation increases tear resistance. Details of the test results are shown in Table 11 below:

TABLE 14

HNBR Testing Results.

| N085-033- | 1 | 2 | 3 | 4 | 5 | 6 |
| --- | --- | --- | --- | --- | --- | --- |
| Mooney Stress Relaxation, ML(1 + 4 + 4)@100° C. | | | | | | |
| Temperature, (° C.) | 100 | 100 | 100 | 100 | 100 | 100 |
| Final Viscosity | 103.5 | 102.4 | 99.5 | 95.3 | 92.2 | 103.1 |
| Time to 80% Decay | 4.05 | 4.06 | 4.06 | 4.06 | 4.04 | 4.05 |
| Slope | −0.56 | −0.51 | −0.49 | −0.47 | −0.59 | −0.54 |
| Viscosity @, 4.5 mins. | 5.8 | 6.6 | 6.6 | 6.8 | 4.1 | 6.0 |
| Mooney Scorch ML @ 100° C., ML(1 + 30) @ 125° C. | | | | | | |
| Minimum Viscosity | 64.3 | 64.3 | 62.9 | 59.8 | 55.7 | 64.3 |
| T5, (min) | 25.2 | 26.2 | 28.7 | >30 | 27.5 | 25.1 |
| T35, (min) | >30 | >30 | >30 | >30 | >30 | >30 |
| MDR-2000 Rheometer, 100 pphm, 30/180° C., 100 cpm, 0.5° arc | | | | | | |
| ML, lbf · in | 1.4 | 1.5 | 1.5 | 1.5 | 1.2 | 1.5 |
| MH, (lbf · in) | 25.3 | 25.4 | 23.4 | 22.4 | 24.0 | 24.0 |
| Ts2, (min) | 0.5 | 0.5 | 0.5 | 0.5 | 0.5 | 0.5 |
| T'90, (min) | 4.2 | 4.1 | 4.1 | 4.1 | 4.1 | 4.1 |
| T'90 Tan Delta | 0.038 | 0.045 | 0.050 | 0.057 | 0.043 | 0.049 |
| Cure Time, (min) Original Vulcanized, | 11 | 11 | 11 | 11 | 11 | 11 |
| Hardness A, (pts) | 74 | 75 | 75 | 74 | 75 | 74 |
| Modulus @ 10%, (psi) | 130 | 129 | 137 | 112 | 123 | 135 |

TABLE 14-continued

HNBR Testing Results.

| N085-033- | 1 | 2 | 3 | 4 | 5 | 6 |
|---|---|---|---|---|---|---|
| Modulus @ 25%, (psi) | 222 | 245 | 243 | 221 | 210 | 241 |
| Modulus @ 50%, (psi) | 410 | 457 | 438 | 406 | 372 | 424 |
| Modulus @ 100%, (psi) | 1157 | 1288 | 1239 | 1133 | 1038 | 1162 |
| Modulus @ 200%, (psi) | 3315 | 3366 | 3220 | 2962 | 3070 | 3202 |
| Tensile, (psi) | 4236 | 4105 | 4115 | 3806 | 4148 | 4243 |
| Elongation, (%) | 254 | 243 | 262 | 261 | 266 | 268 |
| Tear Strength, Die C, | | | | | | |
| Tear Strength, (ppi) | 321 | 331 | 336 | 334 | 322 | 343 |

Figure 12:
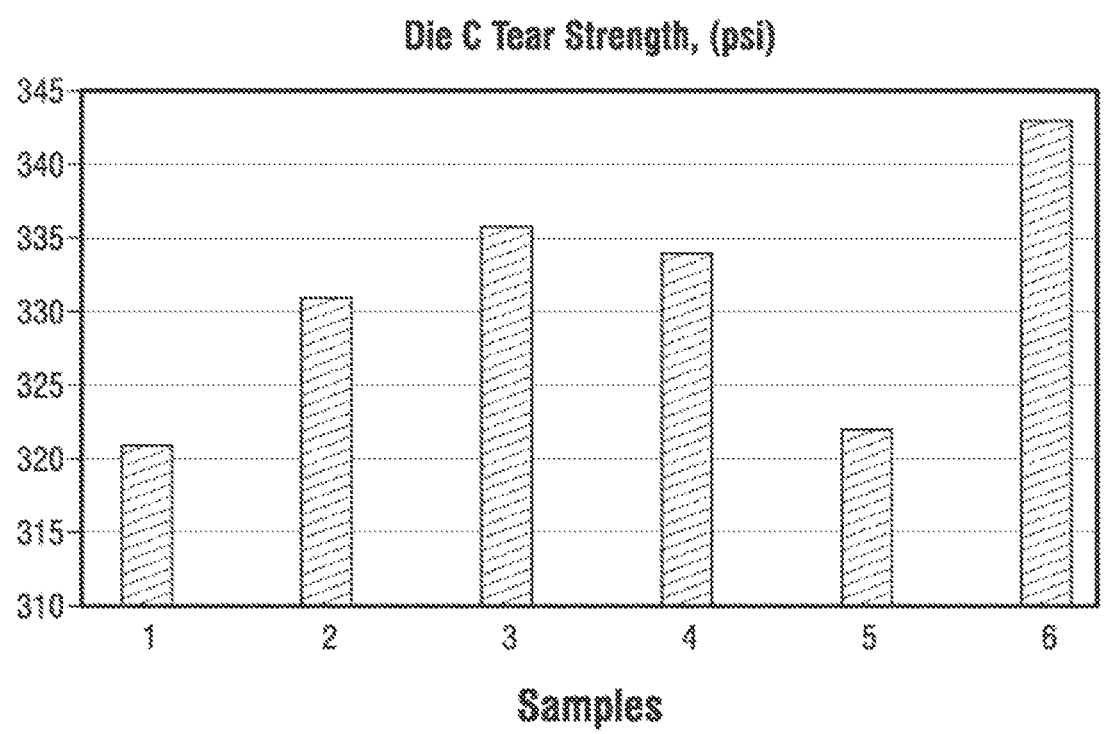
FIG. 12 shows a graph of Die C tear strength results.
Figure 13:
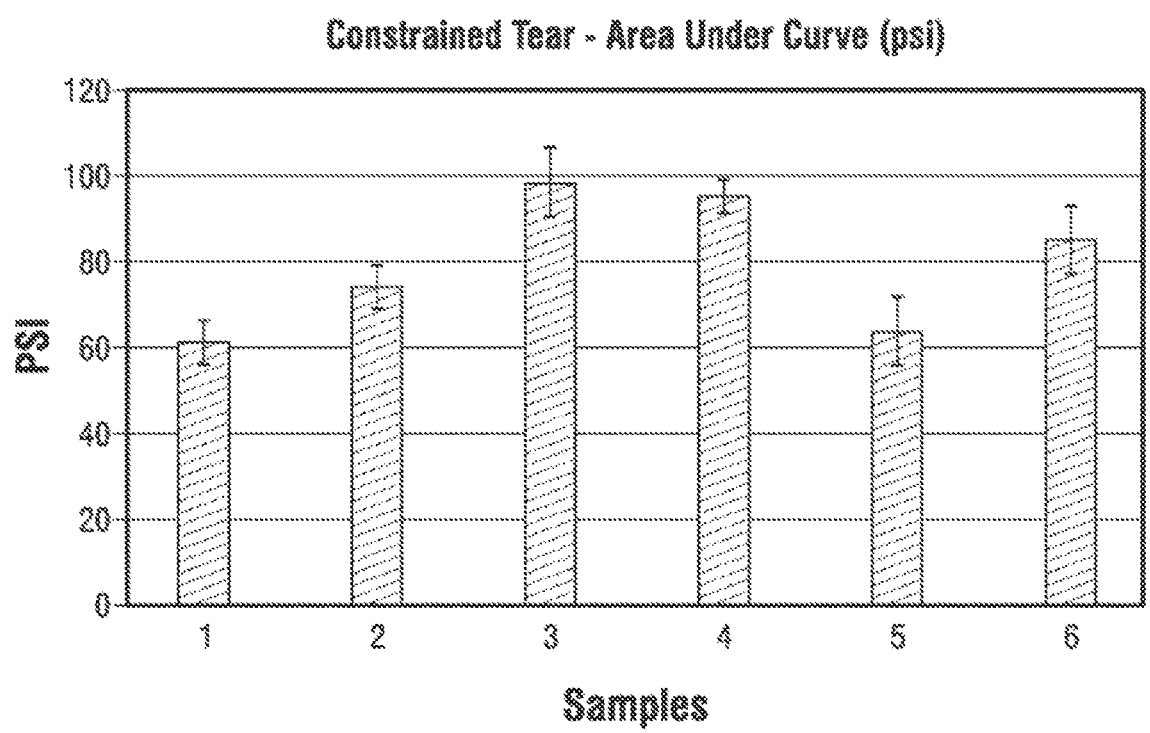
FIG. 13 shows a graph of constrained tear test data.

Graphical Representation of the results of the Die C Tear Strength test and the Constrained Tear Test of the HNBR samples 1-6 are shown in FIGS. 12 and 13. The Die C test is also known as ASTM D-624 and generally measures the force per unit thickness required to initiate a rupture or tear. These results show that the incorporation of carbon nanotubes into rubber formulations increases tear toughness, both in the Die C and Constrained Tear tests. These results also show that incorporation of carbon nanotubes softens, or maintains rubber seal hardness without a loss of physical properties.

TABLE 12

Constrained Tear Data for HNBR Samples

| Sample | Area under curve | Std. Dev. |
|---|---|---|
| 1 | 61 | 5 |
| 2 | 75 | 5 |
| 3 | 98 | 8 |
| 4 | 95 | 4 |
| 5 | 64 | 8 |
| 6 | 85 | 8 |

TABLE 13

Comparison of the Constrained Tear Test results

| Comparison | % Improvement |
|---|---|
| 1 -> 2 | 22% |
| 1 -> 3 | 60% |
| 1 -> 4 | 55% |
| 5 -> 6 | 34% |

Figure 3:
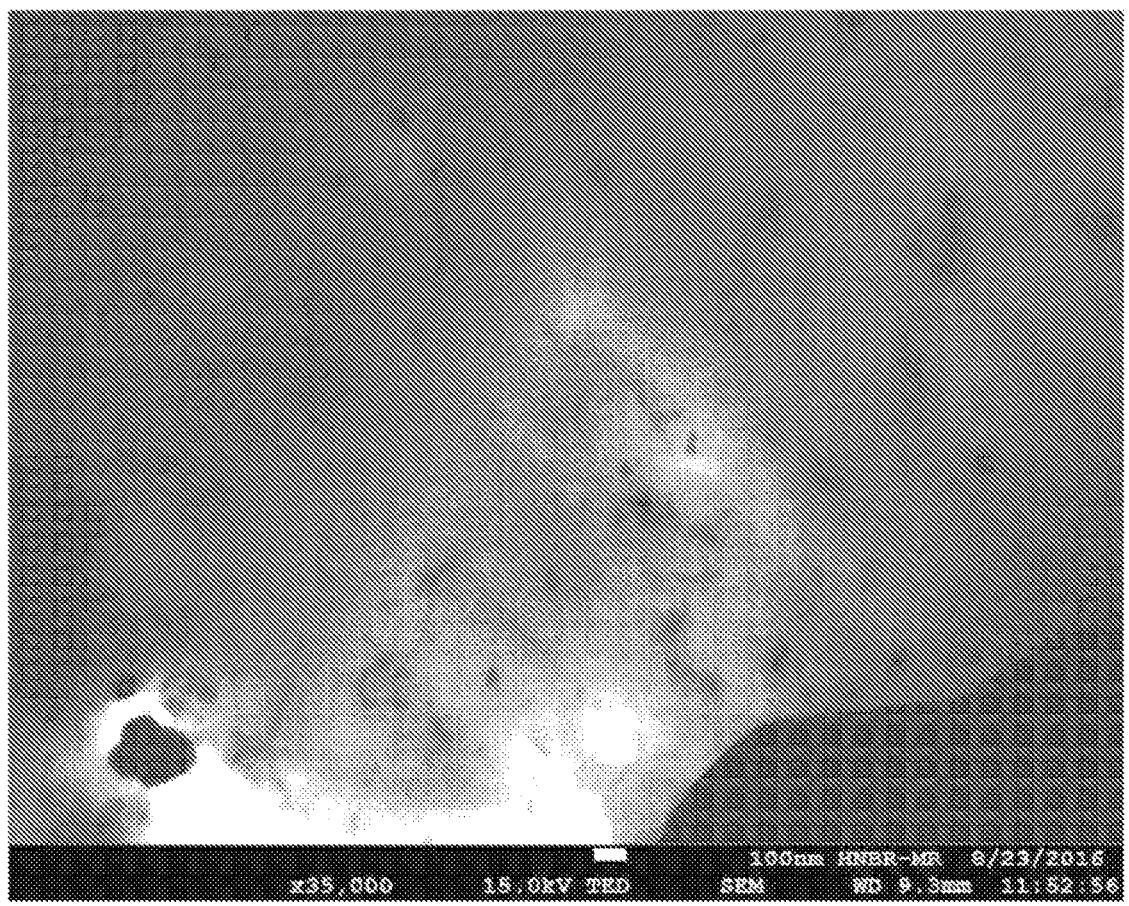
FIG. 3 shows an HNBR sample containing carbon nanotubes dispersed from DLC without carbon black.
Figure 4:
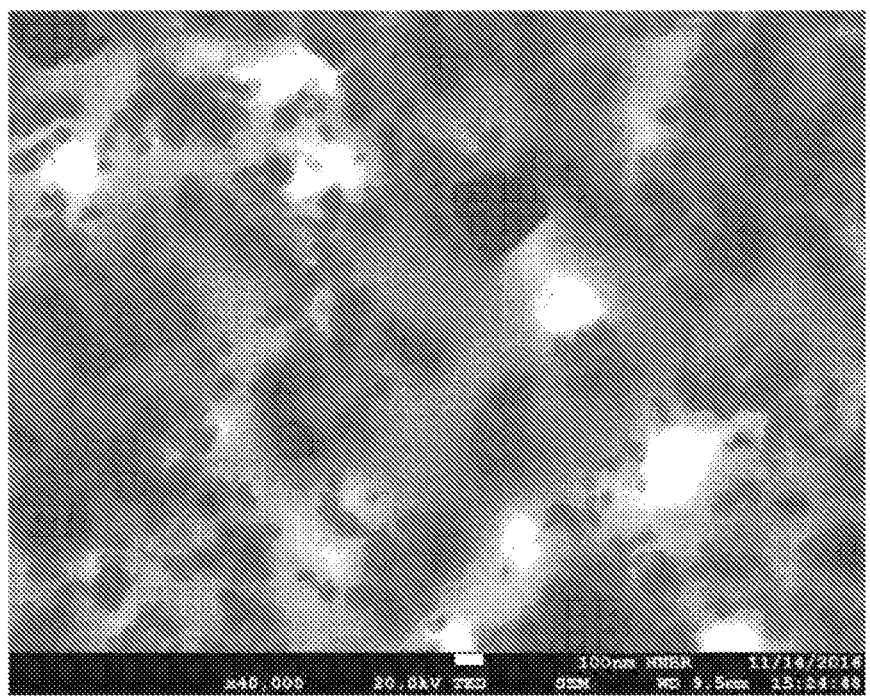
FIG. 4 shows an HNBR sample containing 50 phr carbon black without carbon nanotubes.
Figure 5:
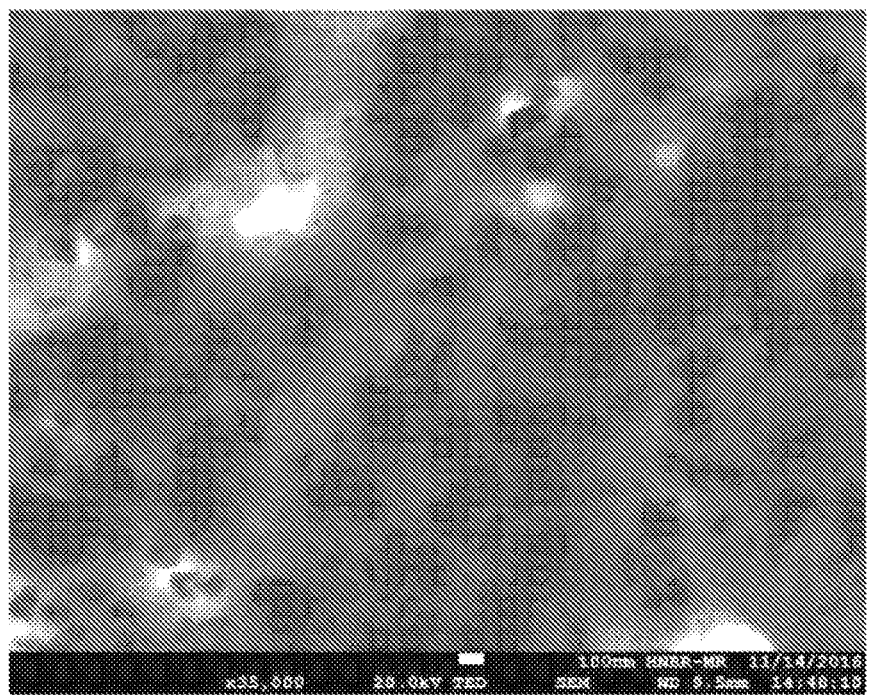
FIG. 5 shows an HNBR sample containing 3 phr carbon nanotubes and 50 phr carbon black.
Figure 6:
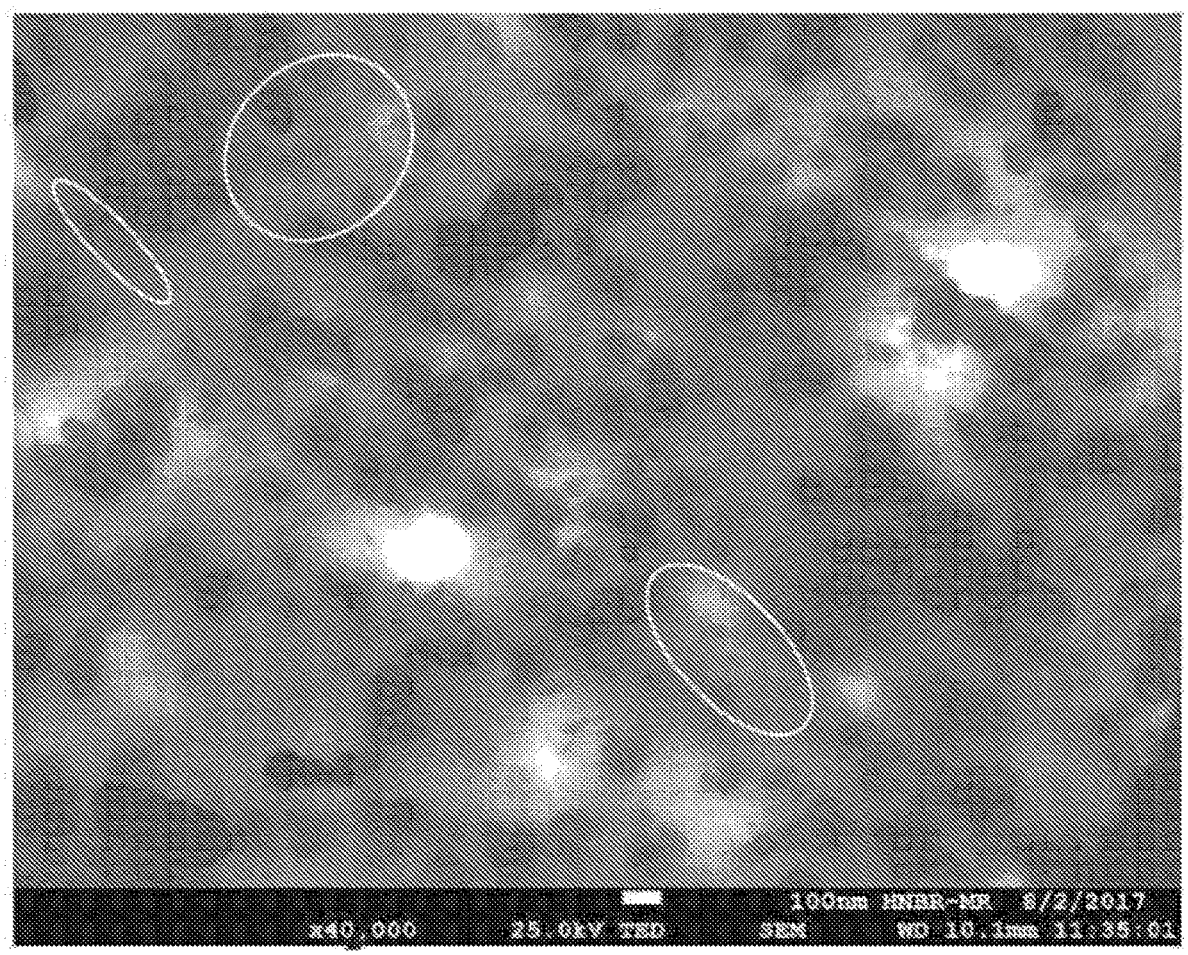
FIG. 6 shows an HNBR sample containing MR dispersed via DLC.
Figure 7:
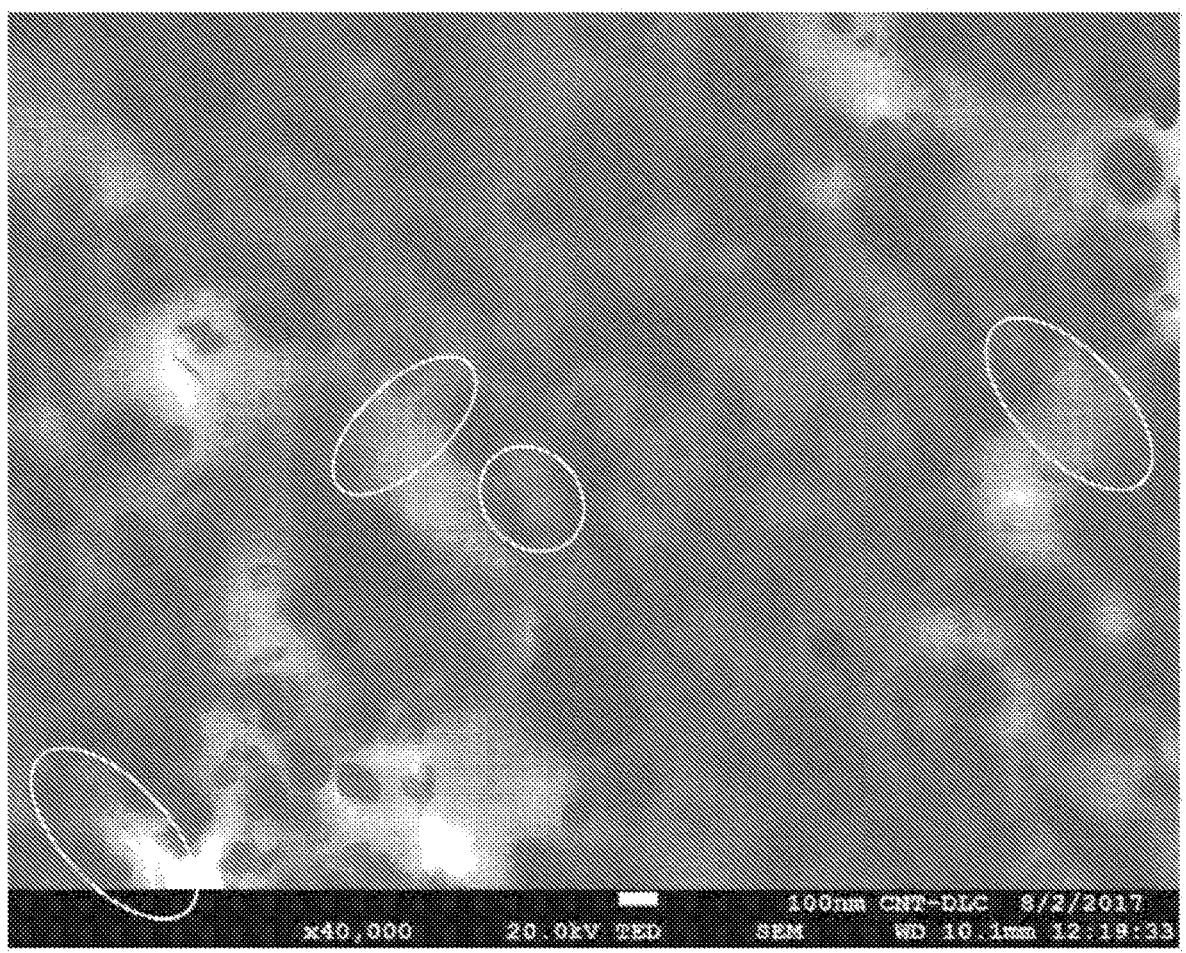
FIG. 7 shows an HNBR sample containing CNTs dispersed via DLC.
Figure 8A:
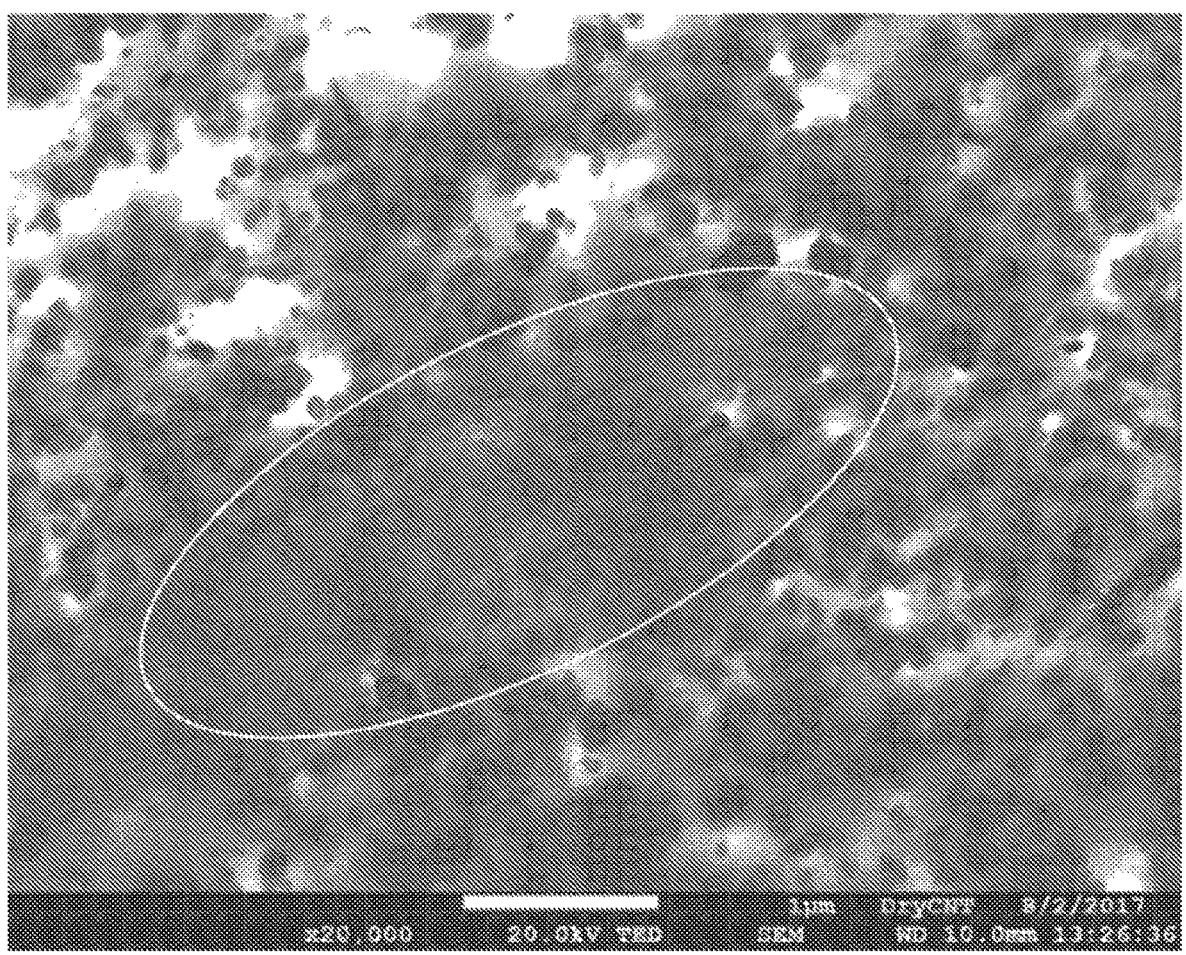
FIGS. 8a and 8b show a HNBR samples containing dry CNTs.
Figure 8B:
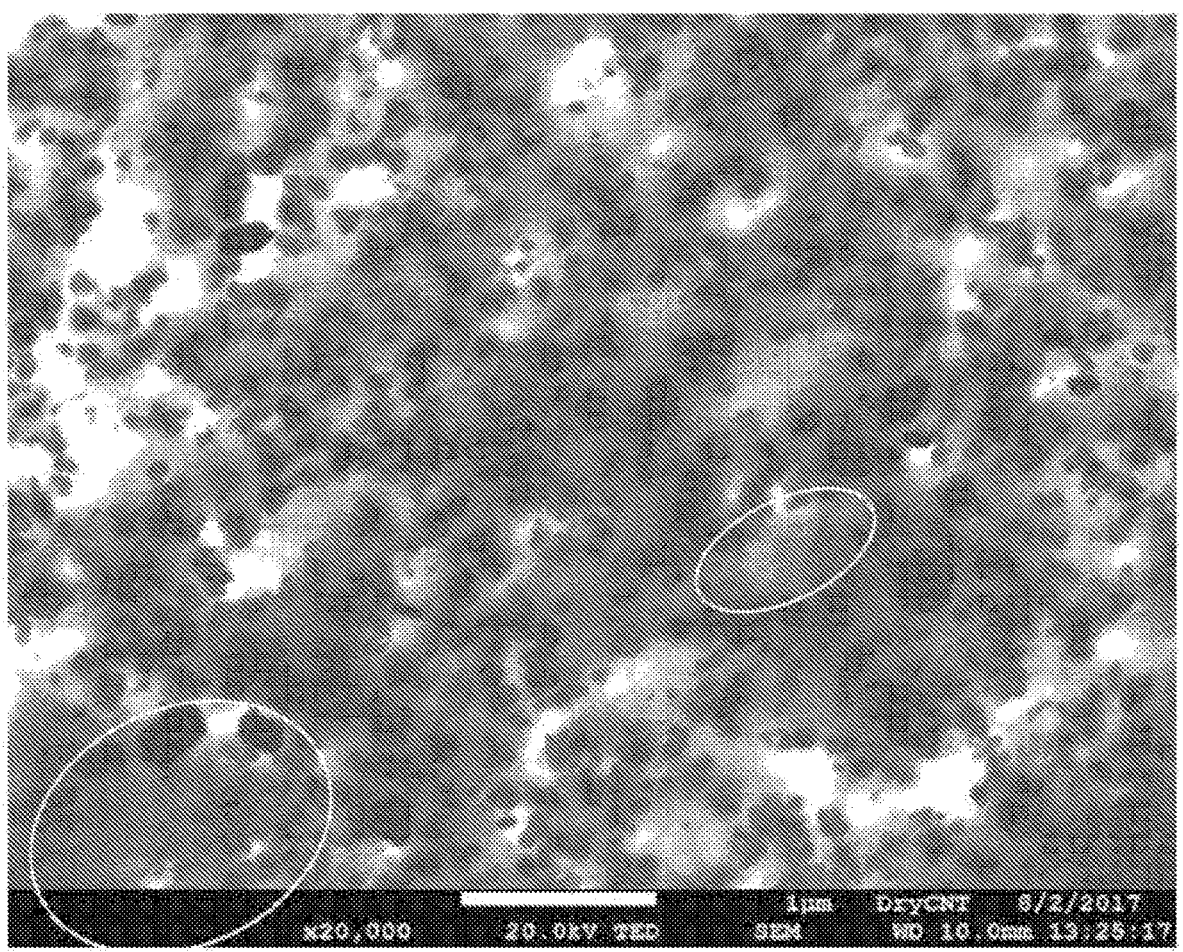

Transmission Electron Microscopy ("TEM") images were taken of HNBR samples with and without carbon nanotubes incorporated. The images are shown in FIGS. 3, 4, and 5. As can be seen by comparison of FIGS. 3 and 5, the carbon nanotubes disperse approximately equivalently in the rubber formulation regardless of whether or not the formulation contains carbon black.

Additional testing of various HNBR formulations comprising carbon nanotubes from DLC as well as dry-carbon nanotubes are disclosed below. The HNBR formulations and testing results are detailed below. In the charts below, "CNT OC" indicates CNANO C9000 tangled carbon nanotubes in a dry liquid concentrate and "DRY CNT" indicates as manufactured CNANO C9000 tangled tubes which are not formed into a DLC.

TABLE 14a

Carbon Nanotubes in HNBR Formulations

| Material | HNBR-FA-01 PHR | HNBR-FA-02 PHR | HNBR-FA-03 PHR | HNBR-FA-04 PHR | HNBR-FA-07 PHR | HNBR-FA-08 PHR | HNBR-FA-09 PHR | HNBR-FA-10 PHR |
|---|---|---|---|---|---|---|---|---|
| HNBR-Zetpol 2020 | 100.00 | 100.00 | 100.00 | 100.00 | 100.00 | 100.00 | 100.00 | 100.00 |
| N550 CB | 50.00 | 50.00 | 50.00 | 50.00 | 50.00 | 50.00 | 50.00 | 50.00 |
| MR 1020 DLC | | | 7.07 | 7.07 | | | | |
| Plasthall TOTM | 8.00 | 5.57 | 2.43 | | 2.20 | | 8.00 | 5.57 |
| CNT OC | | | | | 7.30 | 7.30 | | |
| Dry CNT | | | | | | | 1.50 | 1.50 |
| Stearic Acid | 0.50 | 0.50 | 0.50 | 0.50 | 0.50 | 0.50 | 0.50 | 0.50 |
| Zinc Oxide | 5.00 | 5.00 | 5.00 | 5.00 | 5.00 | 5.00 | 5.00 | 5.00 |
| CDPA | 1.50 | 1.50 | 1.50 | 1.50 | 1.50 | 1.50 | 1.50 | 1.50 |
| ZMTI | 1.00 | 1.00 | 1.00 | 1.00 | 1.00 | 1.00 | 1.00 | 1.00 |
| Varox 802 40-KE | 8.00 | 8.00 | 8.00 | 8.00 | 8.00 | 8.00 | 8.00 | 8.00 |

TABLE 14b

Rheological curing data of carbon nanotubes in HNBR formulations.
ODR (0.5° Arc) 20 Min/180° C.,

|  | HNBR-FA-01 | HNBR-FA-02 | HNBR-FA-03 | HNBR-FA-04 | HNBR-FA-07 | HNBR-FA-08 | HNBR-FA-09 | HNBR-FA-10 |
|---|---|---|---|---|---|---|---|---|
| ML, (lbf · in) | 7.06 | 7.88 | 7.83 | 8.54 | 8.13 | 8.13 | 7.87 | 7.86 |
| MH, (lbf · in) | 59.87 | 61.1 | 57.21 | 61.19 | 60.83 | 61.45 | 60.46 | 60.5 |
| MH-ML (lbf · in) | 52.81 | 53.22 | 49.38 | 52.65 | 52.70 | 53.32 | 52.59 | 52.64 |
| Ts1, (min) | 01:03.3 | 01:03.7 | 1:04 | 01:03.0 | 01:04.9 | 01:04.2 | 01:03.3 | 01:01.4 |
| T'90, (min) | 05:57.6 | 05:51.0 | 05:54.2 | 05:12.2 | 05:18.0 | 05:13.2 | 05:59.4 | 05:54.6 |
| Cure time (T90 + 2) min | 07:57.6 | 07:51.0 | 07:54.2 | 07:12.2 | 07:18.0 | 07:13.2 | 07:59.4 | 07:54.6 |

TABLE 15a

Basic Physical Properties-Tensile, Elongation, Modulus-Mean Data

| | | | | Mean | | | |
|---|---|---|---|---|---|---|---|
| | Total Oil Content | Total MR/CNT Content | Sample ID | Tensile stress at Break (psi) | Elongation at Break (%) | Modulus (psi) | Tensile stress @ 100% (psi) | Tensile stress @ 200% (psi) |
| | 8 | 0 | HNBR-FA-01 | 3,985 | 250 | 2,108 | 1,375 | 3,301 |
| | 5.57 | 0 | HNBR-FA-02 | 3,895 | 240 | 2,123 | 1,376 | 3,213 |
| MR-DLC | 8 | 1.5 | HNBR-FA-03 | 3,911 | 260 | 2,074 | 1,336 | 3,188 |
| MR-DLC | 5.57 | 1.5 | HNBR-FA-04 | 3,839 | 250 | 2,043 | 1,369 | 3,239 |
| CNT-OC | 8 | 1.5 | HNBR-FA-07 | 3,612 | 220 | 2,116 | 1,408 | 3,310 |
| CNT-OC | 5.8 | 1.5 | HNBR-FA-08 | 3,838 | 220 | 2,231 | 1,582 | 3,556 |
| Dry-CNT | 8 | 1.5 | HNBR-FA-09 | 3,801 | 200 | 2,409 | 1,690 | 3,633 |
| Dry-CNT | 5.57 | 1.5 | HNBR-FA-10 | 3,941 | 190 | 2,811 | 1,989 | 4,034 |

TABLE 15b

Basic Physical Properties-Tensile, Elongation, Modulus-Standard Deviation Data

| | | | | Standard Deviation | | | |
|---|---|---|---|---|---|---|---|
| | Total Oil Content | Total MR/CNT Content | Sample ID | Tensile stress at Break (psi) | Elongation at Break (%) | Modulus (psi) | Tensile stress @ 100% (psi) | Tensile stress @ 200% (psi) |
| | 8 | 0 | HNBR-FA-01 | 112 | 10 | 80 | 85 | 115 |
| | 5.57 | 0 | HNBR-FA-02 | 251 | 30 | 234 | 216 | 225 |
| MR-DLC | 8 | 1.5 | HNBR-FA-03 | 129 | 10 | 47 | 82 | 91 |
| MR-DLC | 5.57 | 1.5 | HNBR-FA-04 | 141 | 20 | 72 | 71 | 125 |
| CNT-OC | 8 | 1.5 | HNBR-FA-07 | 130 | 10 | 114 | 103 | 140 |
| CNT-OC | 5.8 | 1.5 | HNBR-FA-08 | 143 | 20 | 106 | 107 | 126 |
| Dry-CNT | 8 | 1.5 | HNBR-FA-09 | 78 | 10 | 145 | 132 | 108 |
| Dry-CNT | 5.57 | 1.5 | HNBR-FA-10 | 101 | 20 | 261 | 192 | 25 |

TABLE 16a

Constrained Tear Test Mean Data

| | Total Oil Content | Total MR/ CNT Content | Sample ID | Mean Tensile stress at Break (psi) | Mean Elongation at Break (%) | Mean width (in) | Mean Thickness (in) | Mean AUCi (ksi) | Mean AUCf (psi) |
|---|---|---|---|---|---|---|---|---|---|
| | 8 | 0 | HNBR-FA-01 | 306 | 28 | 0.50 | 0.09 | 0.07 | 71 |
| | 5.57 | 0 | HNBR-FA-02 | 333 | 30 | 0.50 | 0.09 | 0.08 | 81 |
| MR-DLC | 8 | 1.5 | HNBR-FA-03 | 361 | 33 | 0.50 | 0.10 | 0.11 | 106 |
| MR-DLC | 5.57 | 1.5 | HNBR-FA-04 | 385 | 33 | 0.50 | 0.09 | 0.09 | 99 |
| CNT-OC | 8 | 1.5 | HNBR-FA-07 | 332 | 30 | 0.50 | 0.09 | 0.08 | 86 |
| CNT-OC | 5.8 | 1.5 | HNBR-FA-08 | 367 | 32 | 0.50 | 0.08 | 0.10 | 100 |
| Dry-CNT | 8 | 1.5 | HNBR-FA-09 | 358 | 32 | 0.50 | 0.09 | 0.09 | 94 |
| Dry-CNT | 5.57 | 1.5 | HNBR-FA-10 | 374 | 33 | 0.50 | 0.09 | 0.10 | 105 |

TABLE 16b

Constrained Tear Test Standard Deviation Data

| | Total Oil Content | Total MR/ CNT Content | Sample ID | S.D. Tensile stress at Break (psi) | S.D. Elongation at Break (%) | S.D. AUCi (ksi) | S.D. AUCf (psi) |
|---|---|---|---|---|---|---|---|
| | 8 | 0 | HNBR-FA-01 | 10 | 1 | 0.01 | 4 |
| | 5.57 | 0 | HNBR-FA-02 | 18 | 2 | 0.00 | 5 |
| MR-DLC | 8 | 1.5 | HNBR-FA-03 | 19 | 1 | 0.01 | 7 |
| MR-DLC | 5.57 | 1.5 | HNBR-FA-04 | 44 | 4 | 0.01 | 13 |
| CNT-OC | 8 | 1.5 | HNBR-FA-07 | 16 | 1 | 0.01 | 8 |
| CNT-OC | 5.8 | 1.5 | HNBR-FA-08 | 11 | 1 | 0.01 | 5 |
| Dry-CNT | 8 | 1.5 | HNBR-FA-09 | 8 | 1 | 0.00 | 1 |
| Dry-CNT | 5.57 | 1.5 | HNBR-FA-10 | 18 | 2 | 0.01 | 8 |

TABLE 17a

Die C Tear Test-Mean Data

| Total Oil Content | Total MR/ CNT Content | Sample ID | Maximum Load (N) | Mean Max Load/ Thickness (N/mm) | Mean Max Load/ Thickness (kN/mm) | Mean Thickness (mm) | Mean AUC (J) | Mean Energy at Maximum Load (J) |
|---|---|---|---|---|---|---|---|---|
| 8 | 0 | HNBR-FA-01 | 63 | 25336 | 25.3 | 2.5 | 0.9 | 0.4 |
| 5.57 | 0 | HNBR-FA-02 | 57 | 26032 | 26.0 | 2.2 | 0.8 | 0.4 |

TABLE 17a-continued

Die C Tear Test-Mean Data

| | Total Oil Content | Total MR/ CNT Content | Sample ID | Maximum Load (N) | Mean Max Load/ Thickness (N/mm) | Mean Max Load/ Thickness (kN/mm) | Thickness (mm) | AUC (J) | Energy at Maximum Load (J) |
|---|---|---|---|---|---|---|---|---|---|
| MR-DLC | 8 | 1.5 | HNBR-FA-03 | 65 | 28555 | 28.6 | 2.3 | 1.0 | 0.5 |
| MR-DLC | 5.57 | 1.5 | HNBR-FA-04 | 58 | 28209 | 28.2 | 2.1 | 0.8 | 0.4 |
| CNT-OC | 8 | 1.5 | HNBR-FA-07 | 64 | 27898 | 27.9 | 2.3 | 0.9 | 0.5 |
| CNT-OC | 5.8 | 1.5 | HNBR-FA-08 | 57 | 26543 | 26.5 | 2.1 | 0.8 | 0.4 |
| Dry-CNT | 8 | 1.5 | HNBR-FA-09 | 70 | 29696 | 29.7 | 2.4 | 1.1 | 0.5 |
| Dry-CNT | 5.57 | 1.5 | HNBR-FA-10 | 67 | 28589 | 28.6 | 2.3 | 1.0 | 0.5 |

TABLE 17b

Die C Tear Test-Mean Data

| | Total Oil Content | Total MR/ CNT Content | Sample ID | Standard Deviation Maximum Load (N) | Standard Deviation Max Load/ Thickness (N/mm) | Standard Deviation Max Load/ Thickness (kN/mm) | AUC (J) | Energy at Maximum Load (J) |
|---|---|---|---|---|---|---|---|---|
| | 8 | 0 | HNBR-FA-01 | 4.0 | 1231 | 1.2 | 0.1 | 0.0 |
| | 5.57 | 0 | HNBR-FA-02 | 3.0 | 1274 | 1.3 | 0.1 | 0.0 |
| MR-DLC | 8 | 1.5 | HNBR-FA-03 | 4.2 | 1907 | 1.9 | 0.1 | 0.1 |
| MR-DLC | 5.57 | 1.5 | HNBR-FA-04 | 4.3 | 1579 | 1.6 | 0.1 | 0.0 |
| CNT-OC | 8 | 1.5 | HNBR-FA-07 | 4.9 | 1926 | 1.9 | 0.1 | 0.1 |
| CNT-OC | 5.8 | 1.5 | HNBR-FA-08 | 4.9 | 1264 | 1.3 | 0.1 | 0.0 |
| Dry-CNT | 8 | 1.5 | HNBR-FA-09 | 5.2 | 2260 | 2.3 | 0.2 | 0.1 |
| Dry-CNT | 5.57 | 1.5 | HNBR-FA-10 | 7.7 | 2685 | 2.7 | 0.2 | 0.1 |

Dispersion of MR as Compared to Dispersion of CNTs Via DLC

Transmission Electron Microscopy ("TEM") images were taken of HNBR samples with MR and CNTs dispersed via DLC as well as HNBR sample with dry CNTs. The images are shown in FIGS. 6, 7, 8a and 8b.

As can be seen in FIGS. 6-8b, the dispersion of dry CNTs in rubber formulations is not similar, and is in fact entirely distinct from the dispersion of both MR and CNTs dispersed via DLC. When dry CNTs are incorporated into rubber formulations, dispersion is uneven resulting in portions of rubber contain high CNT concentration as well as voids with relatively few if any CNTs present. This can lead to premature failure of the material during stress/strain events. The non-homogeneous loading of dry-CNTs leads to unpredictable and variable performance of the resulting rubber.

Cut and Chip Enhancements in Natural Rubber Latex

Several formulations of rubber were tested in order to determine the effects of incorporating carbon nanotubes on cut and chip test results using coagulated natural rubber latex as a delivery mechanism. These natural rubber ("NR") blended with polybutadiene rubber ("BR") formulations are generally similar to the rubber formulations used for commercial truck tread and show large improvements in cut and chip testing when 2.5 and 3.5 phr of functionalized and discrete CNT, also known as MR, are incorporated into the rubber formulation. The general composition of these NR/BR formulations are described in the table below.

TABLE 18

NR Formulations with for Cut and Chip Testing.

| Ingredients | Control | +2.5 phr MR | +3.5 phr MR |
|---|---|---|---|
| CV60 Natural Rubber | 80 | 80 | 80 |
| BR 1207 | 20 | 20 | 20 |
| CB N220 | 45 | 45 | 45 |

Figure 9:
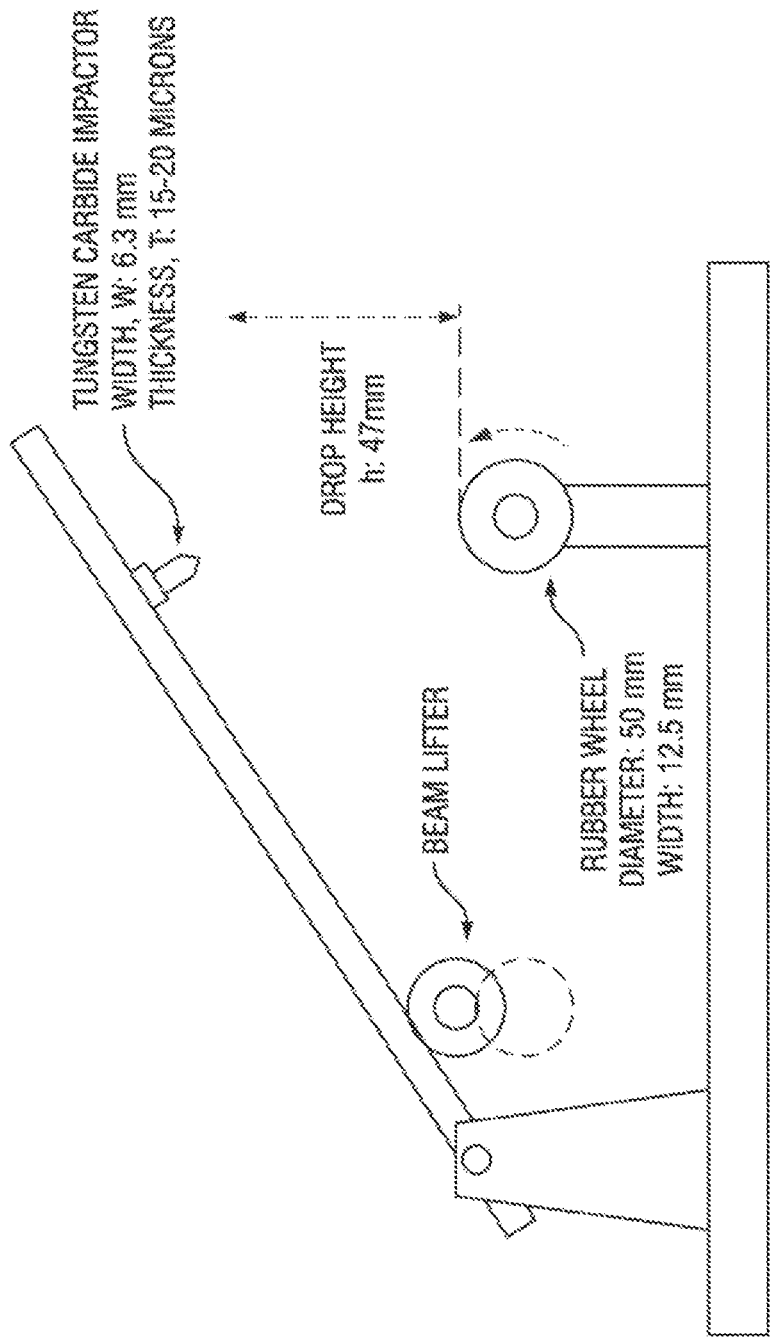
FIG. 9 shows a sketch of a B.F. Goodrich cut and chip testing device.

The cut and chip test has been developed by B.F. Goodrich and is generally depicted in FIG. 9.

Figure 14:
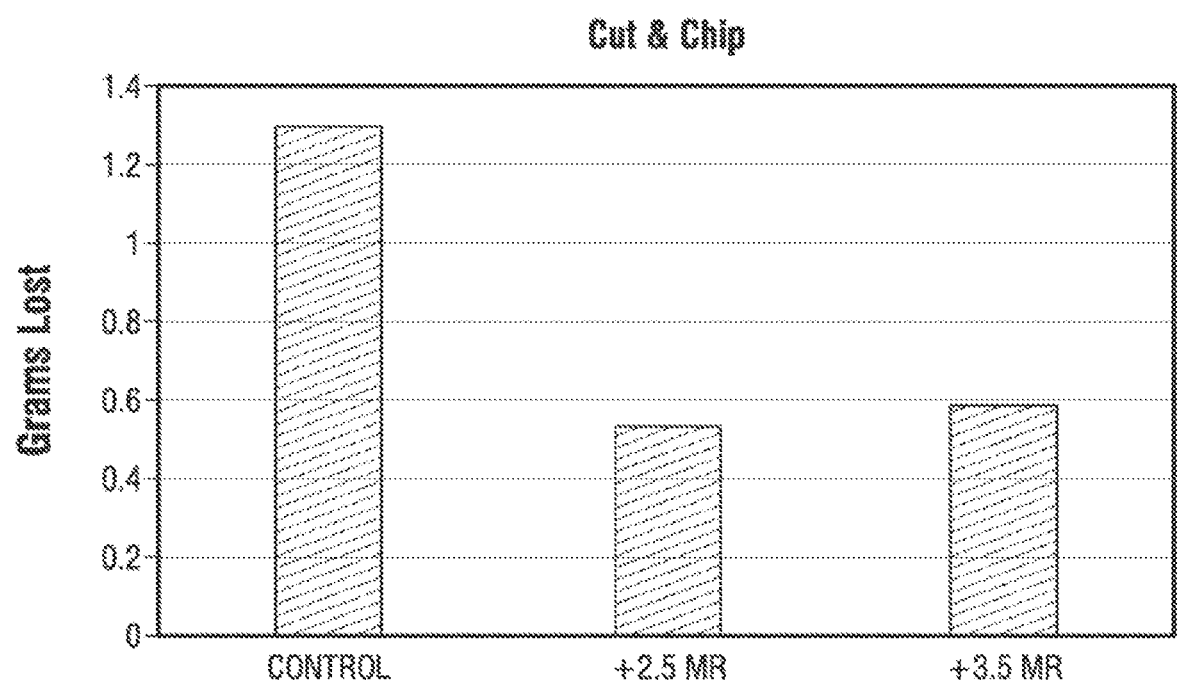
FIG. 14 shows a graph of cut and chip test results.

The cut and chip test indicates how much weight is lost from the original sample as a result of the test. Less weight loss is generally indicative of higher durability and resistance to damage. The results of the cut and chip testing are shown in FIG. 14.

TABLE 19

Cut and Chip test data.

| Compound Identification | Control | 3.5 phr CNT | 2.5 phr CNT |
|---|---|---|---|
| Weight Loss (grams) | | | |
| Sample 1 | 1.6783 | 0.3923 | 0.7050 |
| Sample 2 | 0.9116 | 0.6678 | 0.4701 |
| Average | 1.2950 | 0.5301 | 0.5876 |
| Diameter Loss (inches) | | | |
| Sample 1 | 0.13 | 0.01 | 0.04 |
| Sample 2 | 0.07 | 0.02 | 0.02 |
| Average | 0.10 | 0.02 | 0.03 |

High Shear v. Bundled v. Mixture of High Shear and Bundled Example

Figure 15:
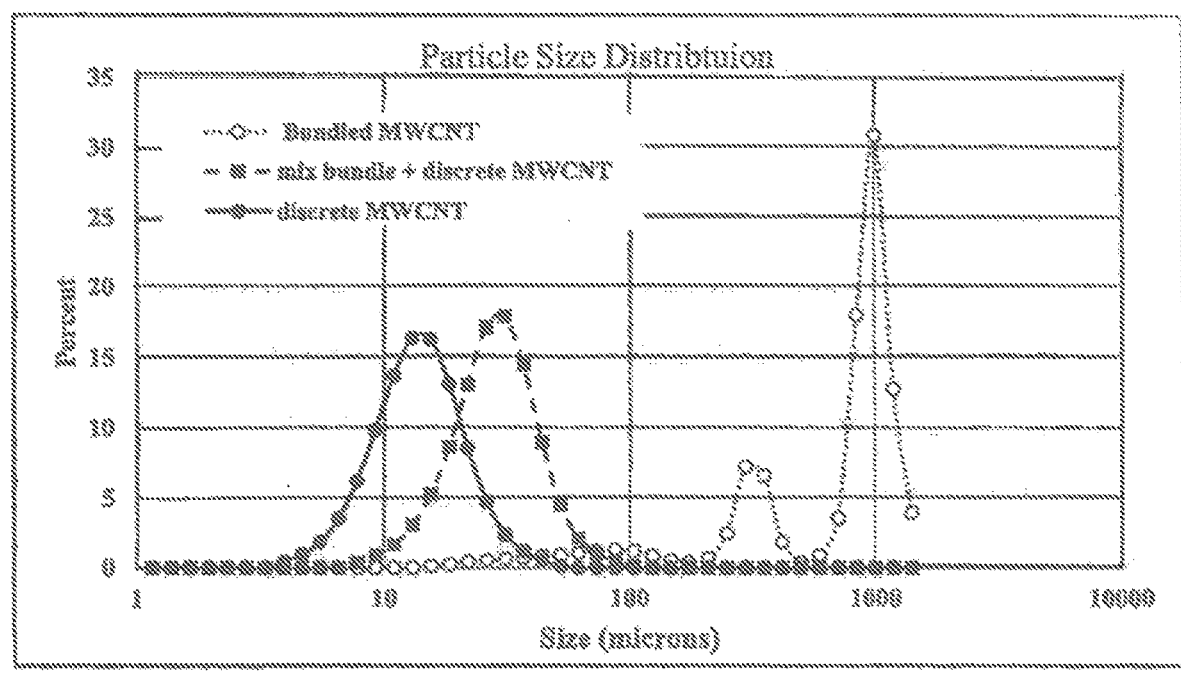
FIG. 15 shows particle size distribution data from the High Shear v. Bundled v. Mixture of High Shear and Bundled Example below.

Three preparations of MWCNT (C9000, CNano Technologies) in water are analyzed for particle size distribution. Size distribution is measured using laser diffraction instrumentation (Microtrac S3500, Microtrac). One skilled in the art will understand that laser diffraction methods for particle size assumes spherical to near spherical shape and particle size of flexible, high aspect ratio particles, such as MWCNT, is a relative measurement influenced by the length and is not the true length of the MWCNT. One preparation is 1% by weight bundled MWCNT in water that are not subjected to intense shear nor any oxidation and is essentially 100% bundled tubes. The second preparation is 1% by weight oxidized, discrete MWCNT in water prepared per example 3. This material is subjected to 10 minutes of high shear in a rotor stator having a gap of 0.5 mm. Then it is subjected to high shear devices with an impingement of 10 microns and pressure of 8000 psi. The total energy is $4.96 \times 10^8$ J/kg. The discrete feature is confirmed by scanning electron microscopy. The third preparation is a mixture of discrete and bundled MWCNT as a 1% by weight concentration in water and is made by subjecting MWCNT bundles to no oxidation. This preparation is subjected to 10 minutes of high shear in a rotor stator having a gap of 0.5 mm. Then it is subjected to a high shear device with an impingement gap of 10 microns and pressure of 8000 psi. The total energy is $1.10 \times 10^8$ J/kg. FIG. 15 shows the distinct difference between fully bundled and discrete MWCNT and the substantial overlap of the mixture with the discrete and a small overlap of the mixture with the bundles. Using the percentile data in Table 20 below, 95% of the discrete MWCNT are less than 25.3 microns. Using this as the limit of the size of discrete tubes, the percentage of discrete MWCNT in the mixture is extrapolated to be 56% discrete.

TABLE 20

| Percentile | Bundled MWCNT [micron] | Mixture of Bundled and Discrete MWCNT [micron] | Discrete MWCNT [micron] |
|---|---|---|---|
| 10 | 123.8 | 13 | 7.2 |
| 20 | 287.2 | 16.2 | 8.9 |
| 30 | 437.2 | 18.8 | 10.2 |
| 40 | 754.3 | 21.2 | 11.4 |
| 50 | 821.2 | 23.6 | 12.7 |
| 60 | 827.6 | 26.3 | 14.1 |
| 70 | 919.6 | 29.5 | 15.7 |
| 80 | 973.2 | 33.7 | 17.9 |
| 90 | 1061 | 41.2 | 21.5 |
| 95 | 1147 | 49.7 | 25.3 |

The data of Table 20 shows that mixtures of bundled and discrete particles may be employed in the applications of the disclosed inventions.

Mixtures like those of Table 20 may comprise tangled carbon nanotubes and discrete carbon nanotubes. Generally, the average particle size of the carbon nanotubes in the mixture may be at least about 15 microns, or at least about 20 microns, or at least about 25 microns, or at least about 35 microns, or at least about 40 microns, up to about 85 microns, or up to about 75 microns, or up to about 65 microns, or up to about 60 microns. The amount of tangled carbon nanotubes in the mixture may vary. Typically, the amount of tangled carbon nanotubes in the mixture may be at least about 20, or at least about 25, or at least abut 30, or at least about 35, or at least about 40 percent based on the total weight of carbon nanotubes in the mixture. On the other hand the amount of tangled carbon nanotubes in the mixture may be up to about 80, or up to about 70, or up to about 60, or up to about 55, or up to about 49 percent based on the total weight of carbon nanotubes in the mixture. Generally, the average particle size of the discrete carbon nanotubes in the mixture is less than those of the tangled carbon nanotubes. In some cases the average particle size of the discrete carbon nanotubes in the mixture may be at least about 15 microns or at least about 20 microns up to about 35 microns or up to about 30 microns. In some case more than about 80%, or more than about 90%, of the discrete carbon nanotubes in the mixture have a particle size of less than about 30 microns.

The discrete and tangled carbon nanotubes mixture may be derived from commercially available multi-walled carbon nanotubes with little or no oxidized species content. That is, the total amount of oxidized species content may be less than about 1 percent, or less than about 0.6 percent, or less than about 0.4 percent relative to total carbon nanotube weight.

The mixture of discrete and tangled carbon nanotubes like those of Table 20 may include additional ingredients. Such ingredients include, for example, a processing oil such as those selected from the group consisting of Trioctyl Trimellitate (TOTM), Dioctyl Adipate (DOA), Dibutoxyethoxyethyl adipate, castor oil, naphthenic oil, residual aromatic extract oil (RAE), treated distillate aromatic extracted oil (TDAE), aromatic oils, paraffinic oils, carnauba wax, curing co-agents, natural waxes, synthetic waxes, and peroxide curatives. Other potential ingredients include rubber compounds, epoxy resins, and polyurethanes.

Generally, the process to obtain the mixture comprising tangled carbon nanotubes and discrete carbon nanotubes like that of Table 20 usually begins with preparing a 14% by weight slurry of bundled, i.e., tangled, carbon nanotubes in water. The mixture is then subjected to a first intense shear device and then optionally subjected to a second intense shear device. The slurry may be processed 1-8 passes through the second intense shear device to yield the desired particle size distribution. The shear devices may include, for example, a rotor stator or homogenizers like a manton gaulin. Thus, an aqueous mixture of entangled nanotubes is sheared at conditions such that the result is a mixture comprising tangled carbon nanotubes and discrete carbon nanotubes, wherein the average particle size of the carbon nanotubes in the mixture is from about 15 to about 85 microns and wherein the amount of tangled carbon nanotubes is from about 20 to about 80 percent based on the total weight of carbon nanotubes in the mixture. Specific shearing conditions may be varied to make the desired size and relative amounts of tangled and discrete carbon nanotubes. Generally, the shearing conditions may comprise a total energy of from about $1 \times 10^7$ Joules/kg to $3 \times 10^8$ Joules/kg.

Applications of the Disclosed Inventions

As discussed above, the incorporation of carbon nanotubes into rubber formulations can enhance the physical properties of the rubber, allowing for greater resistance to being cut, chipped, or generally abraded. Rubber formulations incorporated carbon nanotubes may be useful in mining and milling operations. Durable rubber coatings, also sometimes known as sacrificial rubber coatings, can be applied to exposed or working surfaces in mixing devices, rock crushers, and a wide array of other surfaces that are exposed to harsh operating conditions. Other applications include those not necessarily exposed to operating conditions or elements, and include wear resistant linings, such as pipe liners containing abrasive fluids, such a cement or rock slurry, and conveyor belts.

Abrasion resistant rubber coatings are useful for use creating tires and treads with increased durability and longer operating life. Tires for passenger as well as commercial vehicles and airplanes are envisioned as well as tires for large equipment such as excavators, dump-trucks, agricultural equipment, military equipment, and other heavy machinery.

Abrasion resistant rubber may be applied as a coating for protecting the underlying surfaces from both physical damage as well as chemical or oxidative damage. Such applications include coating the hull of boats and ships, thereby insulating them from potential chemical oxidants such as salt water as well as protecting the hull surface from impacts when docking, mooring, or general wear-and-tear. These coatings could also be used to line both the interior and exterior of reaction vessels which may be in contact with harsh or otherwise reactive chemical agents and/or exposed to physical damage. Protective rubber coatings could be applied to the surfaces of gas cylinders and other pressure vessels in order to prevent damage when they are moved, loaded, unloaded, or transported and may be exposed to contact with transportation equipment as well as other similar vessels. Such coatings could be used for coating truck beds including passenger vehicle pick-up trucks and dump-truck containers as well as the interior of shipping and trucking containers, fork lift and hand-truck components, and other surfaces routinely exposed to abrasion or other harsh conditions.

Abrasion resistant rubber formulations may be tailored to include texture additives in order to create highly durable non-slip coatings which could be used to surfaces which may become wet or slippery in order to protect customers, passengers, employees, and other personnel. Such uses include coating stairs, platforms, and walkways on construction sites, drilling rigs, mining equipment, boats and ships, factories, manufacturing plants, lumber mills, and any environment where precautions against slipping should be taken.

Durable rubber formulations may also be used to manufacture rubber components with increased life span. This includes at least rubber gaskets and seals for use in drilling, mining, construction, mixing, and many other industrial applications. Such gaskets and seals could also be useful in engines, motors, and other high-pressure applications in which longer life, and therefore less frequent maintenance of the gaskets and seals is advantageous.

High durability rubber could also be used for long life vibration and sound dampening components. These components could include bushings for passenger and commercial vehicles. Heavy equipment and airplanes may see particular advantage as the bushings and dampening components in such applications are typically exposed to greater than normal forces and demanding operating conditions.

It will be appreciated that the carbon nanotubes mentioned in this disclosure may be single, double, or multi-walled nanotubes. The nanotubes discussed may be oxidized on the interior and/or exterior surface either separately or in combination. The nanotubes may have closed or open ends and may have other molecules attached to the interior or exterior surfaces through covalent, ionic, Van der Waals, electromagnetic or any form of bond.

It will also be appreciated that while experimental data has been presented for exemplary purposes, the specific rubbers disclosed are not intended to be limiting. It is anticipated that the incorporation of carbon nanotubes, as disclosed throughout, will produce similar results in a wide array of rubbers, elastomers, polymers, and similar materials.

Embodiments of the Invention

1. A composition of a dry liquid concentrate comprising a plurality of tangled carbon nanotubes and processing oil, wherein the nanotubes comprise from about 5% to about 90% of the composition by weight.

2. The composition of embodiment 1, wherein the nanotubes comprise from about 20% to about 80% of the composition by weight.

3. The composition of embodiment 1, wherein the nanotubes comprise from about 40% to about 60% of the composition by weight.

4. The composition of embodiment 1, wherein the rubber processing oil comprising trioctyl trimellitate oil.

5. The composition of embodiment 1, wherein the rubber processing oil comprising dibutoxyethyoxyethyl adipate oil.

6. The composition of embodiment 1, wherein the rubber processing oil comprises naphthenic oil.

7. The composition of embodiment 1, wherein the carbon nanotubes comprise multi-wall carbon nanotubes.

8. The composition of embodiment 1 further comprising at least one rubber compound, thereby forming a discrete carbon nanotube, oil, rubber composition.

9. The composition of embodiment 1, wherein the tangled carbon nanotubes comprise discrete carbon nanotubes, wherein the discrete carbon nanotubes comprise an interior surface and an exterior surface, and wherein the interior surface comprises an oxidized species content from about 0.01 to less than about 1 percent relative to carbon nanotube weight, and the exterior surface comprises an oxidized species content more than about 1 to about 3 percent relative to carbon nanotube weight.

10. The composition of embodiment 9 further comprising at least one rubber compound, thereby forming an oxidized discrete carbon nanotube, oil, rubber composition.

11. A process for dispersing carbon nanotubes into a polymer, comprising the steps of
  (a) soaking and/or agitating entangled carbon nanotubes in a first medium comprising at least one aqueous solution at a temperature above about 25° C.,
  (b) phase transferring the entangled carbon nanotubes in the first medium to a second medium comprising an oil solution,
  (c) mixing the entangled carbon nanotubes in the second medium at a selected shear condition and at a temperature above about 25° C.,
  (d) removing excess or separated aqueous solution from the second medium, and
  (e) mixing using shear conditions higher than that used in (c) in compounding equipment to form a final polymer/dispersed carbon nanotubes formulation.

12. The process of embodiment 11, wherein the steps (a) through (e) are sequential.

13. The process of embodiment 11, wherein the tangled carbon nanotubes in step (a) are commercially available and have not been physically or chemically altered.

14. The process of embodiment 11, wherein the temperature in step (a) is preferably between from about 35° C. to about 100° C., and especially from about 55° C. to about 75° C.

15. The process of embodiment 11, wherein the agitating in step (a) is performed using a high shear mixer, with a shear rate from about $10^6$ to about $10^8$ Joules/m$^3$.

16. The process of embodiment 11, wherein the phase transferring to the second medium in step (b) takes place on a shear-dependent time scale, such that higher shear corresponds to a shorter process time, with shear rates ranging from about $10^6$ to $10^8$ Joules/m$^3$.

17. The process of embodiment 11, wherein the phase transferring from the first medium to the second medium in step (b) occurs at a temperature from about 35° C. to about 100° C., preferably from about 55° C. to about 75° C.

18. The process of embodiment 11, wherein the second medium in step (b) comprises a processing aid and/or rubber compounding ingredient.

19. The process of embodiment 18 wherein the processing aid and/or ingredient is selected from the group consisting of Trioctyl Trimellitate (TOTM), Dioctyl Adipate (DOA), Dibutoxyethoxyethyl adipate, castor oil, naphthenic oil, residual aromatic extract oil (RAE), treated distillate aromatic extracted oil (TDAE), aromatic oils, paraffinic oils, carnauba wax, curing co-agents, natural waxes, synthetic waxes, and peroxide curatives.

20. The process of embodiment 11, wherein the polymer in step (d) is selected from the group consisting of thermoplastics, elastomeric polymers, synthetic rubbers, natural rubbers, hydrocarbon-based polymers, and blends thereof.

21. The process of embodiment 11, wherein the polymer in step (a) comprises a compound selected from the group consisting of natural rubber, styrene butadiene rubber, nitrile butadiene rubber, polybutadiene rubber, ethylene propylene diene rubber, hydrogenated nitrile butadiene rubber, silicone rubber, polyurethane rubber, fluorinated polymers, and perfluorinated polymers.

22. The process of embodiment 11, wherein the final polymer formulation in step (d) has a filler content higher than 15 parts per hundred rubber, preferably from about 20 to about 90 parts per hundred rubber.

23. The process of embodiment 11, wherein the high shear compounding equipment in step (d) exerts $10^6$ to $10^8$ Joules/m$^3$ shear force on the compound 24. The process of embodiment 11, wherein the high shear compounding equipment is selected from the group consisting of a tangential type mixer, intermeshing type mixer, 2 roll mill, calendaring mill, and a screw type extruder, or combination thereof.

25. The process of embodiment 11 wherein the entangled carbon nanotubes in step (a) are present in the first medium at a concentration of from about 1 to about 3 percent by weight of the carbon nanotubes.

26. The process of embodiment 11 wherein the entangled carbon nanotubes in step (b) are present in the second medium at a concentration of from about 10 to about 30 percent by weight of the carbon nanotubes.

27. The process of embodiment 11 wherein the dispersed carbon nanotubes in step (d) are present in the final polymer/dispersed carbon nanotubes formulation at a concentration of from about 0.25 to about 0.5 percent by weight of the carbon nanotubes.

28. The process of embodiment 27 wherein the dispersed carbon nanotubes in the polymer/dispersed carbon nanotube formulation are homogeneously dispersed.

29. The process of embodiment 28 wherein the dispersed carbon nanotubes in the polymer/dispersed carbon nanotube formulation are discrete.

30. The process of embodiment 11 wherein the tangled carbon nanotubes in step (a) are soaking and/or agitating during a time period of from about 5 minutes to about 3 hours.

31. A process of forming an abrasion resistant rubber/carbon nanotubes composition, comprising the steps of
  (a) soaking and/or agitating entangled carbon nanotubes in a first medium comprising at least one aqueous solution at a temperature above about 25° C.,
  (b) phase transferring the entangled carbon nanotubes to a second medium,
  (c) mixing at a selected shear condition and at a temperature above about 25° C.,
  (d) removing excess or separated aqueous solution,
  (e) drying the oil-nanotube solution to form a dry-liquid concentrate, and,
  (f) dispersing the dry liquid concentrate into at least one rubber to form a final abrasion resistant rubber/dispersed carbon nanotubes formulation.

32. The process of embodiment 31 wherein step (f) is accomplished by mixing under shear conditions higher than that used in (c).

Additional Solvent Embodiments

Further embodiments of original embodiment 1-9 are beneficial when substituting a solvent for the original processing oil. The resultant additional embodiments of the invention are:

33. A composition of a dry liquid concentrate comprising a plurality of tangled carbon nanotubes and a solvent, wherein the nanotubes comprise from about 5% to about 90% of the composition by weight.

34. The composition of embodiment 33, wherein the nanotubes comprise from about 20% to about 80% of the composition by weight.

35. The composition of embodiment 33, wherein the nanotubes comprise from about 140% to about 60% of the composition by weight.

36. The composition of embodiment 33, wherein the solvent comprises xylene.

37. The composition of embodiment 33, wherein the solvent comprises N-Methyl-2-pyrrolidone.

38. The composition of embodiment 33, wherein the solvent comprises water.

39. The composition of embodiment 33, wherein the carbon nanotubes comprise multi-wall carbon nanotubes.

40. The composition of embodiment 33 further comprising at least one thermoset, thereby forming a carbon nanotube, solvent, and thermoset composition.

41. The composition of embodiment 1, wherein the tangled carbon nanotubes comprise discrete carbon nanotubes, wherein the discrete carbon nanotubes comprise an interior surface and an exterior surface, and wherein the interior surface comprises an oxidized species content from about 0.01 to less than about 1 percent relative to carbon nanotube weight, and the exterior surface comprises an oxidized species content more than about 1 to about 3 percent relative to carbon nanotube weight.

42. The composition of embodiment 40, wherein the thermoset is crosslinked, thereby removing the solvent and forming a composite comprising a carbon nanotube and a thermoset.

43. The composition of embodiment 33 further comprising at least one transition metal oxide.

The composition of embodiment 43, wherein the transition metal oxide could be chosen from a preferential list including lithium nickel manganese cobalt, lithium iron phosphate, and lithium nickel manganese oxide.

The composition of embodiment 43, wherein the solvent component is removed, thereby forming a composite comprising carbon nanotubes and a transition metal oxide.

We claim:

1. A mixture comprising tangled carbon nanotubes and discrete carbon nanotubes, wherein the average particle size of the carbon nanotubes in the mixture is from about 15 to about 85 microns and wherein the amount of tangled carbon nanotubes is from about 20 to about 80 percent based on the total weight of carbon nanotubes in the mixture; and at least one solvent; wherein the mixture further comprises side groups attached to the carbon nanotube exterior surface wherein the side groups comprise a molecular weight greater that 50 daltons.

2. The mixture of claim 1 wherein the amount of tangled carbon nanotubes is from about 25 to about 70 percent based on the total weight of carbon nanotubes in the mixture.

3. The mixture of claim 1 wherein the amount of tangled carbon nanotubes is from about 50 to about 60 percent based on the total weight of carbon nanotubes in the mixture.

4. The mixture of claim 1 wherein the average particle size of the carbon nanotubes in the mixture is from about 25 to about 75 microns.

5. The mixture of claim 1 wherein the average particle size of the carbon nanotubes in the mixture is from about 35 to about 65 microns.

6. The mixture of claim 1 wherein the average particle size of the carbon nanotubes in the mixture is from about 40 to about 60 microns.

7. The mixture of claim 2 wherein more than about 80% of the discrete carbon nanotubes in the mixture have a particle size of less than about 30 microns.

8. The mixture of claim 1 wherein more than about 90% of the discrete carbon nanotubes in the mixture have a particle size of less than about 30 microns.

9. The mixture of claim 1 wherein the solvent is water.

10. The mixture of claim 1 wherein the solvent is selected from the group consisting of xylene, N-methyl-2-pyrrolidone, methyl ethyl ketone, isopropanol, water, and mixtures thereof.

11. The mixture of claim 1 wherein the carbon nanotubes comprise multi-wall carbon nanotubes.

12. The mixture of claim 1 further comprising at least one thermoset.

13. The mixture of claim 1 further comprising a transition metal oxide.

14. The mixture of claim 13 further comprising a binder material selected from the group consisting of thermoplastic materials.

15. The mixture of claim 13 further comprising a binder material selected from the group consisting of thermoplastic materials having at least one of the monomer units of vinylidene fluoride, carboxymethyl cellulose, carboxy ethyl cellulose, acrylic acid, alkylacrylic acid, vinyl alcohol, vinyl acetate, vinylbutyral, sulfonated polystyrene, styrene-butadiene, and styrene-hydrogenated butadiene.

16. The mixture of claim 1 wherein the discrete carbon nanotubes comprise a total amount of oxidized species content of less than about 3 percent relative to total discrete carbon nanotube weight.

17. The mixture of claim 1 further comprising a transition metal oxide selected from the group consisting of lithium nickel manganese cobalt, lithium iron phosphate, and lithium nickel manganese oxide.

18. The mixture of claim 1 further comprising a surfactant.

19. The mixture of claim 18 wherein the surfactant is selected from the class of anionic, cationic, non-ionic and zwitterionic surfactants.

* * * * *